United States Patent
Faircloth et al.

(10) Patent No.: US 9,545,692 B2
(45) Date of Patent: Jan. 17, 2017

(54) LONG STAND OFF DISTANCE HIGH POWER LASER TOOLS AND METHODS OF USE

(71) Applicants: Brian O. Faircloth, Evergreen, CO (US); Mark S. Zediker, Castle Rock, CO (US); Shararth K. Kolachalam, Highlands Ranch, CO (US); Daryl L. Grubb, Houston, TX (US)

(72) Inventors: Brian O. Faircloth, Evergreen, CO (US); Mark S. Zediker, Castle Rock, CO (US); Shararth K. Kolachalam, Highlands Ranch, CO (US); Daryl L. Grubb, Houston, TX (US)

(73) Assignee: FORO ENERGY, INC., Littleton, CO (US)

( * ) Notice: Subject to any disclaimer, the term of this patent is extended or adjusted under 35 U.S.C. 154(b) by 642 days.

(21) Appl. No.: 14/080,722

(22) Filed: Nov. 14, 2013

(65) Prior Publication Data
US 2016/0221125 A1 Aug. 4, 2016

Related U.S. Application Data

(63) Continuation-in-part of application No. 13/782,869, filed on Mar. 1, 2013, which is a continuation-in-part
(Continued)

(51) Int. Cl.
| | |
|---|---|
| *B23K 26/402* | (2014.01) |
| *B23K 26/40* | (2014.01) |
| *B23K 26/073* | (2006.01) |
| *E21B 43/26* | (2006.01) |
| *E21B 7/15* | (2006.01) |

(52) U.S. Cl.
CPC ......... *B23K 26/402* (2013.01); *B23K 26/0732* (2013.01); *B23K 26/0736* (2013.01); *B23K 26/382* (2015.10); *E21B 7/15* (2013.01); *E21B 43/26* (2013.01)

(58) Field of Classification Search
USPC ....................................... 219/121.6
See application file for complete search history.

(56) References Cited

U.S. PATENT DOCUMENTS

| | | | |
|---|---|---|---|
| 3,998,281 A | 12/1976 | Salisbury et al. | |
| 7,802,384 B2 * | 9/2010 | Kobayashi | E21B 7/00 175/16 |

(Continued)

OTHER PUBLICATIONS

International Search Report and the Written Opinion of the International Searching Authority, PCT/US13/070321, mailed Jun. 13, 2014.
(Continued)

*Primary Examiner* — Quang D Thanh
*Assistant Examiner* — Renee Larose
(74) *Attorney, Agent, or Firm* — Glen P. Belvis; Steptoe & Johnson, LLP.

(57) ABSTRACT

There are provided high power laser cutting tools, optics assembly and laser beam configurations having long stand off distances, which provide high power laser beams, greater than 1 kW, to cut and volumetrically remove targeted materials. There is also provided methods of using these tools using a beam delivery angle that provides for molten material to be removed by flowing out of the targeted material.

26 Claims, 23 Drawing Sheets

Related U.S. Application Data of application No. 13/768,149, filed on Feb. 15, 2013, now Pat. No. 9,242,309, which is a continuation-in-part of application No. 13/222,931, filed on Aug. 31, 2011, which is a continuation-in-part of application No. 13/210,581, filed on Aug. 16, 2011, now Pat. No. 8,662,160, which is a continuation-in-part of application No. 12/544,136, filed on Aug. 19, 2009, now Pat. No. 8,511,401, which is a continuation-in-part of application No. 12/544,094, filed on Aug. 19, 2009, now Pat. No. 8,424,617, and a continuation-in-part of application No. 12/706,576, filed on Feb. 16, 2010, now Pat. No. 9,347,271, and a continuation-in-part of application No. 12/840,978, filed on Jul. 21, 2010, now Pat. No. 8,571,368, and a continuation-in-part of application No. 12/543,986, filed on Aug. 19, 2009, now Pat. No. 8,826,973.

(60) Provisional application No. 61/727,096, filed on Nov. 15, 2012, provisional application No. 61/605,429, filed on Mar. 1, 2012, provisional application No. 61/605,434, filed on Mar. 1, 2012, provisional application No. 61/378,910, filed on Aug. 31, 2010, provisional application No. 61/374,594, filed on Aug. 17, 2010, provisional application No. 61/090,384, filed on Aug. 20, 2008, provisional application No. 61/102,730, filed on Oct. 3, 2008, provisional application No. 61/106,472, filed on Oct. 17, 2008, provisional application No. 61/153,271, filed on Feb. 17, 2009.

(56) References Cited

U.S. PATENT DOCUMENTS

| | | | |
|---|---|---|---|
| 8,997,894 B2* | 4/2015 | Zediker | E21B 7/14 175/57 |
| 2003/0132029 A1 | 7/2003 | Parker | |
| 2006/0237233 A1 | 10/2006 | Reed et al. | |
| 2007/0068705 A1 | 3/2007 | Hosie et al. | |
| 2007/0272407 A1 | 11/2007 | Lehman et al. | |
| 2010/0044102 A1 | 2/2010 | Rinzler et al. | |
| 2010/0044103 A1 | 2/2010 | Moxley et al. | |
| 2010/0044104 A1 | 2/2010 | Zediker | |
| 2010/0044105 A1* | 2/2010 | Faircloth | E21B 7/14 175/16 |
| 2010/0044106 A1 | 2/2010 | Zediker | |
| 2010/0215326 A1 | 8/2010 | Zediker | |
| 2010/0258289 A1 | 10/2010 | Lynde et al. | |
| 2010/0326659 A1* | 12/2010 | Schultz | E21B 29/02 166/297 |
| 2011/0290563 A1 | 12/2011 | Kocis et al. | |
| 2012/0020631 A1 | 1/2012 | Rinzler | |
| 2012/0067643 A1 | 3/2012 | DeWitt | |
| 2012/0068086 A1 | 3/2012 | DeWitt | |
| 2012/0074110 A1* | 3/2012 | Zediker | B08B 7/0042 219/121.72 |
| 2012/0217015 A1 | 8/2012 | Zediker | |
| 2012/0217017 A1 | 8/2012 | Zediker | |
| 2012/0217018 A1 | 8/2012 | Zediker | |
| 2012/0217019 A1 | 8/2012 | Zediker | |
| 2012/0248078 A1 | 10/2012 | Zediker | |
| 2012/0255774 A1 | 10/2012 | Grubb | |
| 2012/0255933 A1 | 10/2012 | McKay | |
| 2012/0261188 A1 | 10/2012 | Zediker | |
| 2012/0266803 A1 | 10/2012 | Zediker | |
| 2012/1267168 | 10/2012 | Grubb | |
| 2012/0273269 A1 | 11/2012 | Rinzler | |
| 2012/0273470 A1 | 11/2012 | Zediker | |
| 2012/0275159 A1 | 11/2012 | Fraze | |
| 2013/0011102 A1 | 1/2013 | Rinzler | |
| 2013/0175090 A1 | 7/2013 | Zediker | |
| 2013/0192893 A1 | 8/2013 | Zediker | |
| 2013/0192894 A1 | 8/2013 | Zediker | |
| 2013/0220626 A1 | 8/2013 | Zediker | |
| 2013/0228372 A1 | 9/2013 | Linyaev | |
| 2013/0228557 A1 | 9/2013 | Zediker | |
| 2013/0266031 A1 | 10/2013 | Norton | |
| 2013/0319984 A1 | 12/2013 | Linyaev | |
| 2014/0000902 A1 | 1/2014 | Wolfe | |
| 2014/0060802 A1 | 3/2014 | Zediker | |
| 2014/0060930 A1 | 3/2014 | Zediker | |
| 2014/0069896 A1 | 3/2014 | Deutch | |
| 2014/0090846 A1 | 4/2014 | Deutch | |
| 2014/0190949 A1 | 7/2014 | Zediker | |
| 2014/0231085 A1 | 8/2014 | Zediker | |
| 2014/0231398 A1 | 8/2014 | Land | |
| 2014/0248025 A1 | 9/2014 | Rinzler | |
| 2014/0345872 A1 | 11/2014 | Zediker | |

OTHER PUBLICATIONS

International Search Report and the Written Opinion of the International Searching Authority, PCT/US13/77614, mailed Nov. 3, 2014.

* cited by examiner

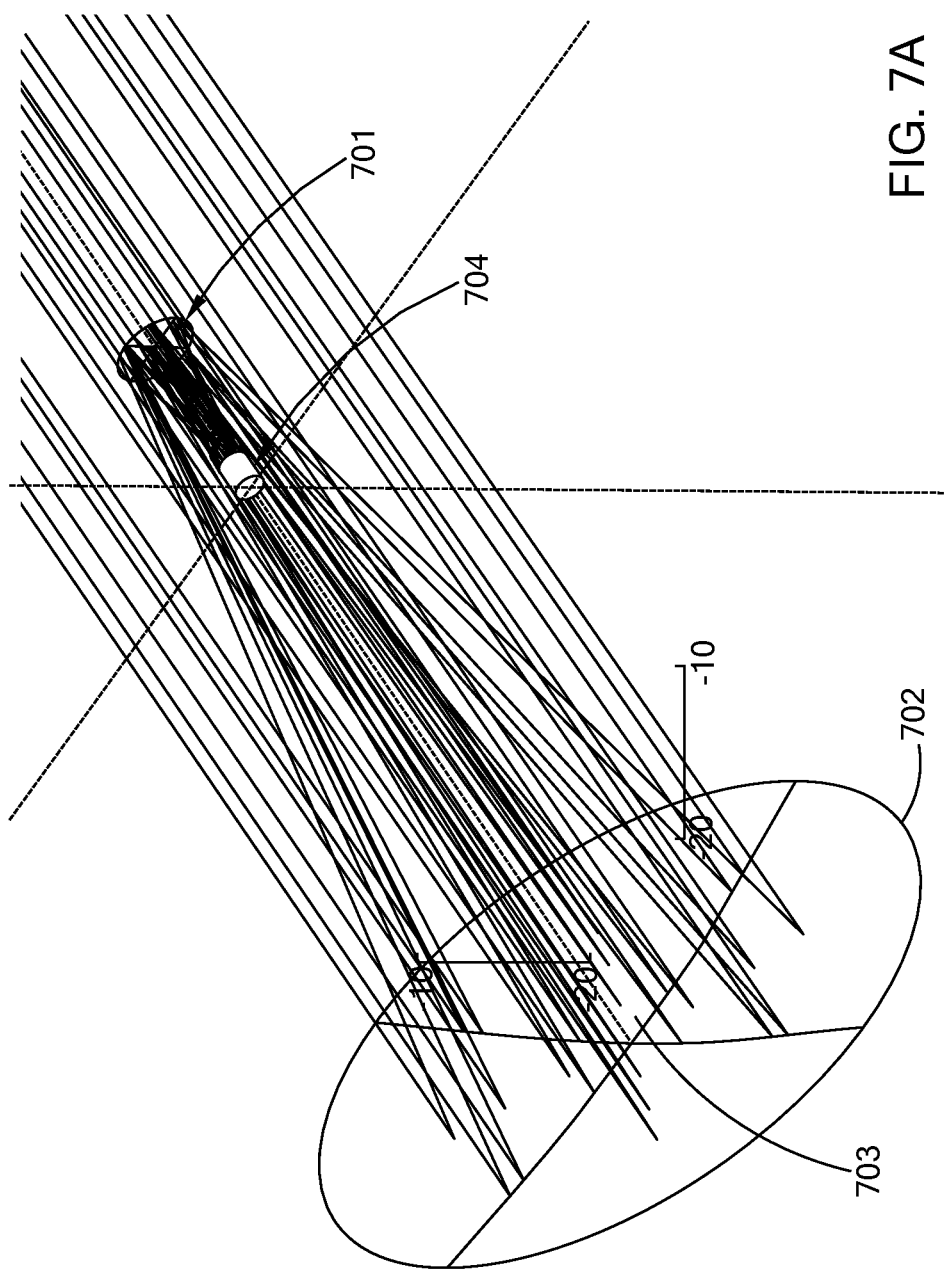

LONG STAND OFF DISTANCE HIGH POWER LASER TOOLS AND METHODS OF USE

This application: (i) claims, under 35 U.S.C. §119(e)(1), the benefit of the filing date of Nov. 15, 2012 of U.S. provisional application Ser. No. 61/727,096; (ii) is a continuation-in-part of Ser. No. 13/782,869, filed Mar. 1, 2013, which claims under 35 U.S.C. §119(e)(1), the benefit of the filing date of Mar. 1, 2012 of U.S. provisional application Ser. No. 61/605,429; (iii) is a continuation-in-part of Ser. No. 13/768,149, filed Feb. 15, 2013, which claims, under 35 U.S.C. §119(e)(1), the benefit of the filing date of Mar. 1, 2012 of U.S. provisional application Ser. No. 61/605,434; (iv) is a continuation-in-part of U.S. patent application Ser. No. 13/222,931 filed Aug. 31, 2011, which claims under 35 U.S.C. §119(e)(1), the benefit of the filing date of Aug. 31, 2010 of provisional application Ser. No. 61/378,910; (v) is a continuation-in-part of U.S. patent application Ser. No. 13/210,581, filed Aug. 16, 2011, which claims, under 35 U.S.C. §119(e)(1), the benefit of the filing date of Aug. 17, 2010 of provisional application Ser. No. 61/374,594; (vi) is a continuation-in-part of U.S. patent application Ser. No. 12/544,136, filed Aug. 19, 2009, which claims, under 35 U.S.C. §119(e)(1), the benefit of the filing date of Aug. 20, 2008 of provisional application Ser. No. 61/090,384, the benefit of the filing date of Oct. 3, 2008 of provisional application Ser. No. 61/102,730, the benefit of the filing date of Oct. 17, 2008 of provisional application Ser. No. 61/106,472, and the benefit of the filing date of Feb. 17, 2009 of provisional application Ser. No. 61/153,271; (vii) is a continuation-in-part of U.S. patent application Ser. No. 12/544,094, filed Aug. 19, 2009; (viii) is a continuation-in-part of U.S. patent application Ser. No. 12/706,576 filed Feb. 16, 2010; (ix) is a continuation-in-part of U.S. patent application Ser. No. 12/840,978 filed Jul. 21, 2010; and, (x) is a continuation-in-part of U.S. patent application Ser. No. 12/543,986, filed Aug. 19, 2009, the entire disclosures, of each, of which are incorporated herein by reference.

BACKGROUND OF THE INVENTION

Field of the Invention

The present inventions relate to methods, apparatus and systems for the delivery of high power laser beams over a distance to a work surface to perform a laser operation on the work surface, such as, treating, fracturing, tunneling, weakening, welding, annealing, cutting, removing, drilling, penetrating, and combinations and variations of these. The work surfaces, for example, may be roads, the earth, bridge supports, dams, meat, animal and human tissue, food products, ice, rocks, rock faces, pipes, conduit, tubes, columns, wire, cables, girders, beams, buildings, concrete, reinforced concrete, rebar, metal, coal, ore, shale, tar sands, mineral containing materials, steel, tanks, and support structures.

As used herein the term "earth" should be given its broadest possible meaning, and includes, the ground, all natural materials, such as rocks, and artificial materials, such as concrete, that are or may be found in the ground, including without limitation rock layer formations, such as, granite, basalt, sandstone, tar sands, dolomite, sand, salt, limestone, ores, minerals, overburden, marble, rhyolite, quartzite and shale rock.

As used herein, unless specified otherwise, the terms "borehole," "tunnel," "shaft" and similar such terms should be given their broadest possible meaning and include any opening that is created in the earth, in a structure (e.g., building, protected military installation, nuclear plant, or ship), in a work surface, or in a structure in the ground, (e.g., foundation, roadway, airstrip, cave or subterranean structure) that is substantially longer than it is wide, such as a well, a tunnel, a hole, a well bore, a mine shaft, a well hole, a micro hole, slimhole and other terms commonly used or known in the arts to define these types of narrow long passages. Boreholes may further have segments or sections that have different orientations, they may have straight sections and arcuate sections and combinations thereof; and for example may be of the shapes commonly found when directional drilling is employed or when mining tunnels follow ore deposits. Thus, as used herein unless expressly provided otherwise, the terms "bottom", "bottom surface" or "end," and similar such terms, when used in relation to a borehole, tunnel or shaft, refer to the end of the borehole, tunnel or shaft, i.e., that portion that is farthest along the path from the opening, start, the surface of the earth, or the beginning.

As used herein, unless specified otherwise, the terms, "cut," "cutting," "sectioning" and similar such terms should be given their broadest possible meaning, and include the remove of material in a pattern that is longer than it is wide, which would include a pattern that is linear, substantially linear, curved, annular, geometric (such as a rectangle, square, trapezoid, etc.) or non-geometric (such as a trace of a natural structure like an ore seam, or other pattern that does not have a common geometric name). A cut may be continuous, such that the material is removed by the laser along the entirely of the pattern, or it may be staggered or partial, which could be viewed as a series of lands (where no material is removed) and cuts (where material is removed), stitches, perforations, spaced holes, etc. The use of the term "completed" cut, and similar such terms, includes severing a material into two sections, i.e., a cut that is all the way through the material, or removing sufficient material to meet the intended objective of the cut. A borehole, a tunnel, a hole, an opening, or any volumetric shape of removed material, may be made using cuts placed adjacent, or substantially adjacent one an another, as for example by delivering the laser beam in a raster scan pattern.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

SUMMARY

There has been a long standing need for the delivery of high power laser beams over distances, and in particular through free space, to laser process materials. The present inventions, among other things, solve these and other needs by providing the articles of manufacture, devices and processes taught herein.

Thus, there is provided a method of shaped volumetric removal from a material using high power directed energy, by: applying high power directed energy having a power sufficient to penetrate the material in a predetermined three dimensional pattern, corresponding to a predetermined volumetric shape; removing the material along the three dimensional pattern; weakening material adjacent to the pattern, thereby creating directed energy affected areas of the material; the directed energy affected areas substantially occupying the predetermined volumetric shape; and, removing the material from the predetermined volumetric shape.

There is further provided methods of these shaped volumetric removals of materials in which one or more of the following may also be practiced: wherein the three dimensional pattern has a line; wherein the line forms a spiral; wherein the three dimensional pattern has a length, a width and a depth, and the depth is at least about 10 feet; wherein the three dimensional pattern has a plurality of lines; wherein at least two of the plurality of lines is interconnected; wherein the volumetric shape corresponds to a mineral deposit; wherein the depth of penetration is self-limiting; wherein the volumetric shape is a cube; wherein the volumetric shape is a cylinder; wherein the directed energy is a high power laser beam having at least about 1 kW of power; wherein the directed energy is a high power laser beam having at least about 1 kW of power; wherein the directed energy is a high power laser beam having at least about 1 kW of power; wherein the directed energy is a high power laser beam having at least about 1 kW of power; wherein the directed energy is a high power laser beam having at least about 10 kW of power; wherein the directed energy is a high power laser beam having at least about 10 kW of power; wherein the directed energy is a high power laser beam having at least about 10 kW of power; wherein the directed energy is a high power laser beam having at least about 10 kW of power; wherein the directed energy is a high power laser beam having at least about 50 kW of power; wherein the directed energy is a high power laser beam having at least about 60 kW of power; wherein the directed energy is a high power laser beam having at least about 80 kW of power.

Additionally there is provided a method of shaped volumetric removal from a material using high power laser energy, the method having the following steps: directing a high power laser beam having a power sufficient to penetrate the material in a predetermined three dimensional pattern, corresponding to a predetermined volumetric shape; removing the material along the three dimensional pattern; creating laser affected areas of material adjacent to the pattern; the laser affected areas substantially filling the predetermined volumetric shape; and, removing the material from the predetermined volumetric shape.

There is further provided methods of these shaped volumetric removals of materials in which one or more of the following may also be practiced: wherein the laser beam is a CW beam; wherein the laser beam is a pulsed beam; wherein the power is at least about 10 kW; wherein the power is at least about 20 kW; wherein the laser beam is applied from a high power laser cutting tool positioned at a stand off distance from a surface of the material; wherein the stand off distance is at least about 3 ft; wherein the stand off distance is at least about 10 ft; wherein the stand off distance is at least about 20 ft; wherein the stand off distance is at least about 30 ft; wherein the laser beam is applied from a high power laser cutting tool positioned at a stand off distance from a surface of the material; the laser beam has a spot size and spot shape along the laser beam, and a waist having a focal point and a distal end and a proximal end defining a waist length therebetween; wherein the spot size of the beam waste is less than about 2.5 cm$^2$; wherein the spot size of the beam waste is less than about 2.5 cm$^2$, and the waist length is at least about 2 ft; wherein the spot size of the beam waste is less than about 2.5 cm$^2$, the waist length is at least about 2 ft, and the stand off distance is at least about 3 ft; wherein the spot size area at the beam waste is less than about 2.5 cm$^2$, the waist length is at least about 2 ft, the stand off distance is at least about 3 ft, and the proximal end of the beam waist is at the surface of the material; wherein the beam shape is circular; wherein the beam shape is rectangular; wherein the beam shape is a linear; wherein the spot size of the beam waste is less than about 2.0 cm$^2$; wherein the spot size of the beam waste is less than about 2.0 cm$^2$, and the waist length is at least about 4 ft; wherein the spot size of the beam waste is less than about 2.0 cm$^2$, the waist length is at least about 4 ft, and the stand off distance is at least about 10 ft;

Still further, there is provided methods of these shaped volumetric removals of materials in which one or more of the following may also be practiced: wherein the spot size of the beam waste is less than about 2.0 cm$^2$, the waist length is at least about 4 ft, the stand off distance is at least about 10 ft, and the proximal end of the beam waist is at the surface of the material; wherein the spot size of the beam waste is less than about 2.0 cm$^2$, the waist length is at least about 4 ft, the stand off distance is at least about 10 ft, and the distal end of the beam waist is at the surface of the material; wherein the spot size of the beam waste is less than about 2.0 cm$^2$, the waist length is at least about 4 ft, the stand off distance is at least about 10 ft, and the proximal end of the focal point is at the surface of the material.

Moreover, there is provided methods of these shaped volumetric removals of materials in which one or more of the following may also be practiced: wherein the laser beam is directed at a beam angle of at least about 5°; wherein the laser beam is directed at a beam angle of at least about 10°; wherein the laser beam is directed at a beam angle of at least about 25°; wherein the laser beam is directed at a beam angle of at least about 30°; wherein the laser beam is directed at a beam angle of at least about 80°; wherein the laser beam is directed at a beam angle of at least about 5°; wherein the laser beam is directed at a beam angle of at least about 10°; wherein the laser beam is directed at a beam angle of at least about 30°; wherein the laser beam is directed at a beam angle of at least about 80°; wherein the laser beam is directed at a beam angle of at least about 5°; wherein the laser beam is directed at a beam angle of at least about 10°; wherein the laser beam is directed at a beam angle of at least about 25°.

Yet further, there is provided a high power laser tool for long stand off distance cutting of a material, the tool having: a source of high power laser energy, a source of a fluid, and an optics package; the optics package having a cooling means, and an optics assembly; the optics assembly configured to provide a laser beam from the tool, the beam having a focal length, a spot size, a spot shape, and a waist having a focal point and a distal end and a proximal end defining a waist length therebetween.

Still further, there is provided these tools for the removal of materials in which one or more of the following may also be present or practiced: wherein the spot size of the beam waste is less than about 2.5 cm$^2$; wherein the spot size of the beam waste is less than about 2.5 cm$^2$, and the waist length is at least about 2 ft; wherein the spot size of the beam waste is less than about 2.5 cm$^2$, the waist length is at least about 2 ft; whereby the tool has a stand off distance of at least about 3 ft; wherein the beam shape is circular; wherein the beam shape is rectangular and has a length of about 2.0 cm and a width of about 0.5 cm; wherein the beam shape is rectangular and has a length of at least about 5 cm and a width of less than about 1 cm; the spot size of the beam is less than about 2.0 cm$^2$; wherein the spot size of the beam is less than about 2.0 cm$^2$; wherein the beam waist length is at least about 4 ft; wherein the spot size of the beam waste is less than about 2.0 cm$^2$, the waist length is at least about 4 ft; whereby the tool has a stand off distance of at least about 10 ft; wherein the laser source has a power of at least about 5 kW; wherein the laser source has a power of at least about 10 kW; wherein the laser source has a power of at least about 40 kW; and wherein the laser source has a power of at least about 60 kW.

Furthermore, there is provided a method of removing material using high power laser energy, including: directing a high power laser beam having a power of at least about 1 kW and a beam angle of greater than about 2° toward a surface of a material; the laser beam creating a hole in the material having a bottom having molten material; and, advancing the hole by flowing the molten material back towards the laser beam, thereby exposing solid material for the laser beam to melt.

Furthermore, there is provided a method of removing material using high power laser energy, including: directing a high power laser beam having a power of at least about 1 kW and a beam angle of at least about 10° toward a surface of a material; the laser beam creating a hole in the material having a bottom having molten material; and, advancing the hole by flowing the molten material back towards the laser beam, thereby exposing solid material for the laser beam to melt.

Furthermore, there is provided a method of removing material using high power laser energy, including: directing a high power laser beam having a power of at least about 1 kW and a beam angle of at least about 30° toward a surface of a material; the laser beam creating a hole in the material having a bottom having molten material; and, advancing the hole by flowing the molten material back towards the laser beam, thereby exposing solid material for the laser beam to melt.

Furthermore, there is provided a method of removing material using high power laser energy, including: directing a high power laser beam having a power of at least about 1 kW and a beam angle of at least about 80° toward a surface of a material; the laser beam creating a hole in the material having a bottom having molten material; and, advancing the hole by flowing the molten material back towards the laser beam, thereby exposing solid material for the laser beam to melt.

Still additionally, there is provided a method of removing material using high power laser energy, by: directing a high power laser beam having a power of at least about 1 kW toward a surface of a material; the laser beam creating a hole in the material having a bottom having molten material; and, advancing the hole by flowing the molten material back towards the laser beam, thereby exposing solid material for the laser beam to melt.

BRIEF DESCRIPTION OF THE DRAWINGS

FIG. 7A is a perspective view and ray trace of an embodiment of an optics assembly in accordance with the present inventions.

DESCRIPTION OF THE PREFERRED EMBODIMENTS

In general, the present inventions relate to the delivery of high power laser beams over a distance to a work surface to perform a laser operation on the work surface. These distances, e.g., the stand off distance, may be greater, and may be substantially larger than typically occurs, or is obtainable, in laser cutting operations. Further, and preferably, the present inventions provide the ability to perform these distant cuts without the need for, with a minimum need for, or with a reduced need for a fluid jet to remove the laser effected material, e.g., dross, slag, or molten material, created by the laser operation. Thus, among other things, the longer stand off distances, alone or in conjunction with, minimizing the need for mechanical cleaning of the cut, e.g., fluid jet, provides the ability to perform laser operations in the field, including in hostile and remote locations, such as, a quarry, a tunnel, a pit, a mine, a well bore, or a nuclear reactor. The laser operations may include, for example, treating, fracturing, tunneling, weakening, melting, ablating, spalling, vaporizing, cooking, charring, welding, heating, annealing, cutting, removing, drilling, penetrating, perforating and combinations and various of these and other activities.

Figure 1:
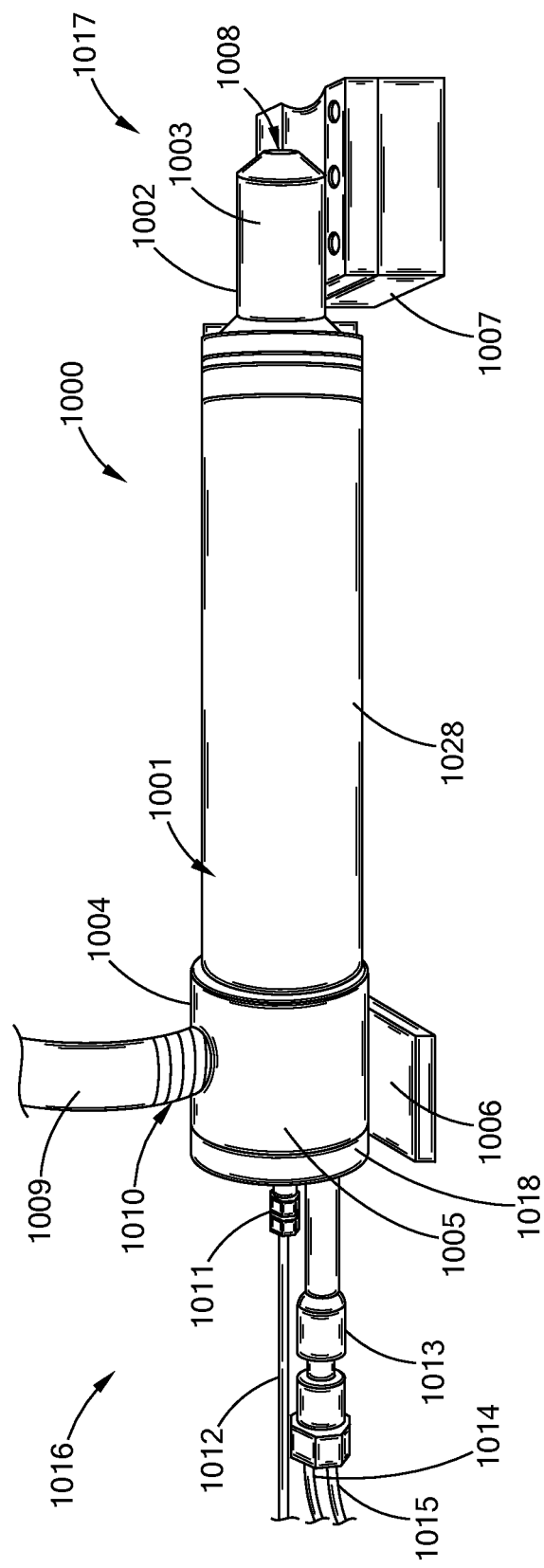
FIG. 1 is a perspective view of an embodiment of a long stand off distance high power laser cutting tool in accordance with the present invention.

Turning to FIG. 1 there is shown a perspective view of an embodiment of a long stand off distance high power laser cutting tool. The cutting tool 1000 has a laser discharge end 1017 and a back end 1016. A high power laser beam is propagated, e.g., fired from the laser discharge end 1017 of the cutting tool 1000. The cutting tool 1000 has a tool body 1001, having a laser discharge section 1002 and a gas inlet section 1004. The laser discharge section 1002 has a laser discharge section body 1003 and the gas inlet section 1004 has a gas inlet section body 1005. The laser discharge section body 1003 has an opening 1008 for the laser beam to pass through as it travels along a laser beam path to a work surface.

In FIG. 1, the cutting tool 1000 is shown positioned on a back support 1006 and a front support 1007. Generally, these supports may be part of a supporting assembly such as a stand or tripod. They may be independent freestanding supports. They may have height adjustment capabilities; and may have other adjustment, aiming, alignment, targeting, or tracking capabilities. These capabilities may be associated with measuring and positioning devices so that the position of the cutting tool with respect to a predetermined reference point or points can be known. Such capabilities may be manual, automatic, program driven, controller driven, and combinations and variations of these. These supports may be mounts that are part of a piece of equipment, such as an earth remover, a tracked vehicle, a trailer, etc. Additionally, there may be only a single support, or there may be two, three, four or more supports; and these supports may be mounted, attached, fixedly removable, to the same or different sections of the cutting tool as the sections of the cutting tool 1000 where supports 1006, 1007 are located. Preferably, one or both, of the supports is used to adjust and set the cutting angle of the laser beam path and the laser beam with respect to the work surface.

The gas inlet section body 1005, has a gas inlet line 1009 and connector 1010, for securing the gas inlet line 1009 to the gas inlet section body 1005. The gas inlet section body 1005 has a back end piece 1018, which has a fitting 1011 for an optical fiber cable 1012. The back end piece 1018, also has an auxiliary fitting 1013 for data line 1014, and data line 1015.

Figure 1A:
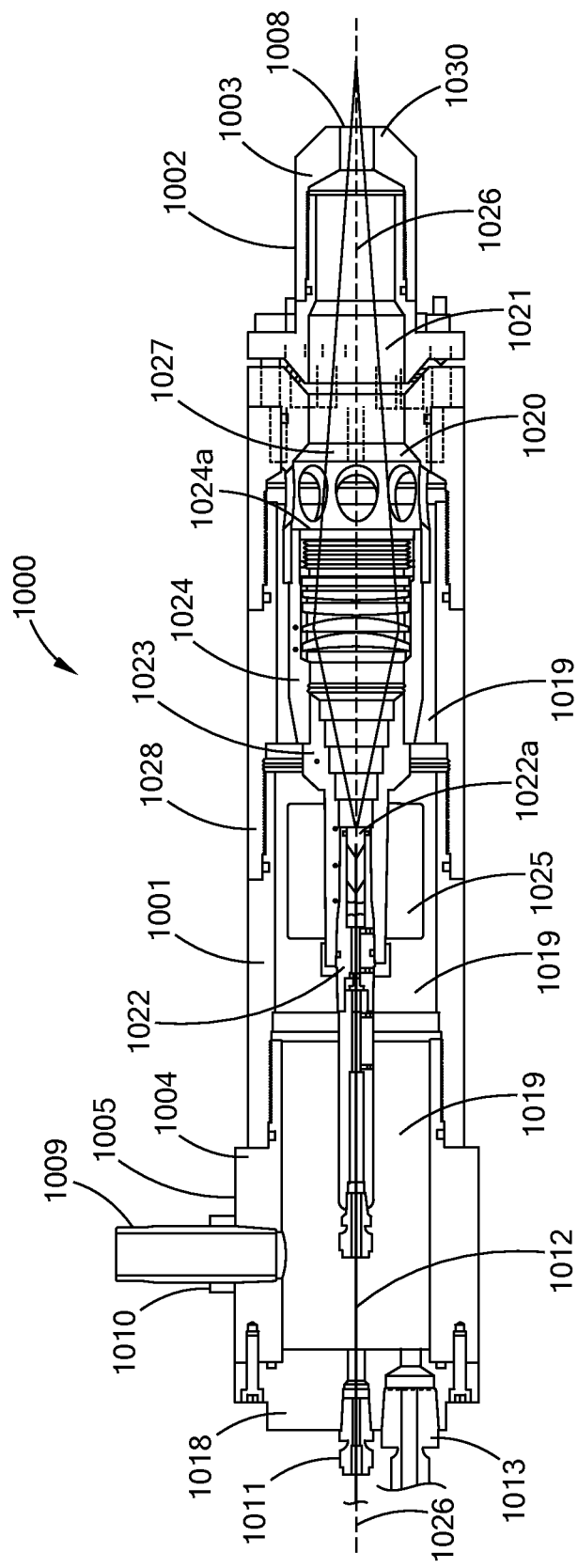
FIG. 1A is a cross sectional view of the tool of FIG. 1.

Turning to FIG. 1A, there is shown a cross section of the embodiment of FIG. 1 (without the supports). There is a gas flow passage 1019 that channels the gas from the gas inlet line 1009 along the length of the tool, around the exterior of a series of optical components. The gas flow is then transitioned, by gas flow carryover section 1020, from a location exterior to the optical components to gas flow passage 1021, which is positioned in, on and associated with the laser beam path 1026, where the gas then exits the tool through opening 1008. The gas flow passage 1019 is within the gas inlet section body 1005 and the optics section body 1028 of the tool 1000. The optical section body 1028 is made of up several bodies that are threaded together. The back end of the optical section body 1028 is connected by a threaded connection to the front end of the gas inlet section body 1005. The front end of optical section body 1028 is attached by threaded members, e.g., bolts, to the laser discharge section body 1003.

Generally, the various body sections of the tool may be separate components or they may be integral. They may be connected by any means available that meets the use requirements for the tool. Preferably, the tool, as assembled, should be sufficiently rigid to withstand anticipated vibration and mechanical shocks so that the optical components will remain in optical alignment. The tool body may be made from a single component or tube, it may be made from two, three or more components that are fixed together, such as by threaded connections, bolts, screws, flanges, press fitting, welding, etc. Preferably, the tool, as assembled, should meet the anticipated environmental conditions for an intended use, such as temperature, temperature changes, moisture, weather conditions, vibration, shock (e.g., being dropped) and dust and dirt conditions. The tool body, and body sections may be made from metal, composite materials, or similar types of materials that provide the requisite performance capabilities.

As used herein, unless specified otherwise, the terms front, and distal, are used to refer to the side or portion of a body, component, or structure that is the laser discharge side, is closer to the laser discharge end of the tool, or is further from the source of the laser beam, when the tool is assembled or operational. The terms back or proximal, as used herein and unless specified otherwise, are used to refer to the side or portion of a body, component, or structure that is the back side, is further from the laser discharge end of the tool, or is closer to the source of the laser beam, when the tool is assembled or is operational.

Returning to FIG. 1A, the optical fiber cable 1012 extends into the gas inlet section body 1005 and the gas flow passage 1019. The optical fiber cable 1012 is optically and mechanically associated with optical connector 1022, which is positioned in optical connector receptacle 1023. The optical connector receptacle has a plurality of fins, e.g., 1025, which extend into gas flow passage 1019, and which provide cooling for the optical connector 1022 and the optical connector receptacle 1023. The laser beam path is represented by dashed line 1026, and extends from within the core of the optical fiber cable 1012 to a potential target or work surface. (The totality of the optical path would start at the source of the laser beam, and extend through all optical components, and free space, that are in the intended path of the laser beam.) At the distal end 1022a of optical connector 1022, the laser beam path 1026 is in free space, e.g., no solid components are present, and travels from the distal connector end 1022a to the optics package 1024, where the laser beam is optically manipulated to predetermined laser beam parameters for providing long stand off distance capabilities. The laser beam path 1026 exits the distal end 1024a of the optics package 1024, and travels in free space in the flow carry over section 1020, in the front section of the optical section body 1028, and in the laser discharge section body 1003, exiting through opening 1008. In operation the laser beam 1027 would be propagated by a laser, e.g., a source of a laser beam, and travel along the laser beam path 1026.

Figure 1B:
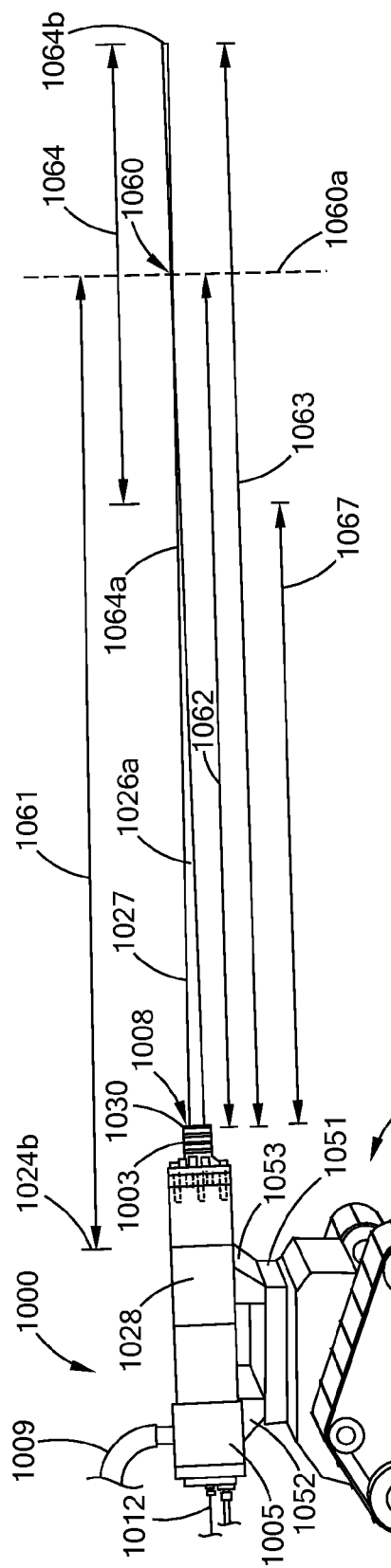
FIG. 1B is a perspective view of the tool of FIG. 1 mounted on an embodiment of a vehicle in accordance with the present inventions.

Turning to FIG. 1B the tool 1000 is shown mounted on an embodiment of a mobile unit 1050. The tool 1000 is firing the laser beam 1027. In this embodiment the mobile unit 1050 is a tracked robotic vehicle. The mobile unit 1050 has a tool positioning and control unit 1051, which has the capability to have three axis of movement. The positioning and control unit 1051 is associated with a control system to provide for the aiming, e.g., position, location, scanning and movement in a pattern, of the laser beam path and laser beam. Preferable the laser tool is optically associated with a laser that has the capability to provide an aiming laser beam, which is eye safe and preferably visible, e.g., 532-670 nm, and a cutting or work laser beam, which has the request power and other beam properties, e.g., >1 kW, >5 kW, >10 kW, >15 kW, >20 kW, and >40 kW, to perform the intended laser activities. Preferably the aiming laser beam travels along the same laser beam path as the cutting laser beam. These beam paths may be separate, parallel, or converging.

In this embodiment of the tool, the optics package 1024 has lenses that provided for a long focal length, e.g., greater than about 100 mm (3.94"), greater than about 150 mm (5.91"), greater than about 250 mm (9.84"), greater than about 500 mm (19.68"), greater than about 1,000 mm (39.37"), greater than about 1,500 mm (59.06"), greater than about 2,000 mm (78.74"), greater than about 22,860 mm (75') and greater; and from about 250 mm to about 1,500 mm, and about 500 mm to about 1,000 mm.

Turning to FIG. 1B, there is shown an imaginary plane 1060*a*, for the purpose of reference, that passes through a point on the laser beam path 1060 that corresponds to the focal point of the laser beam. Thus, double arrow 1062 shows the distance from the distal end or face of the tool 1000 to the focal point 1060; double arrow 1061 shows the distance from the distal end of the optics package 1024*a* to the focal point 1060, which generally corresponds to the focal length of the optics. Based upon the laser beam properties, e.g., power, spot size, spot shape, focal length, and work material properties, there may be an optimum portion or length 1064 of the laser beam, which generally may be equal distance on either side of the focal point, and typically corresponds to the laser beam waist or laser beam depth of focus. Additionally, double arrow 1063 shows the distance from the face 1030 of the tool to the distal end 1064*b* of the beam waist 1064; and double arrow 1067 shows the distance from the face 1030 of the tool to the proximal end 1064*a* of the beam waist 1064.

The stand off distance, which is the distance from the face or distal end 1030 of the laser tool 1000 to the work surface can be greater than about 0.5 feet, greater than about 1 foot, greater than about 3 feet, greater than about 4 feet, and greater. As laser power increases, and laser beam properties are selected, the stand off distance may be about 10 feet and greater. Further, as laser power increases, laser beam properties are selected, and, if needed, means for assisting the laser beam path from the tool to the work surface are used, e.g., a special atmosphere, a jet, or a means to keep the beam path clear, even greater stand off distances may be used, e.g., 50 feet, 75 feet, 100 feet, or more. Generally, across the stand off distance the laser beam path will be in free space, e.g., the laser beam would not be traveling through any solid components, e.g., an optical fiber core, a lens, a window. Thus, for example, the laser beam could be traveling through the atmosphere, e.g., the environmental conditions at a work site, upon exiting the tool at opening 1008 until it strikes the intended work surface.

Figure 1C:
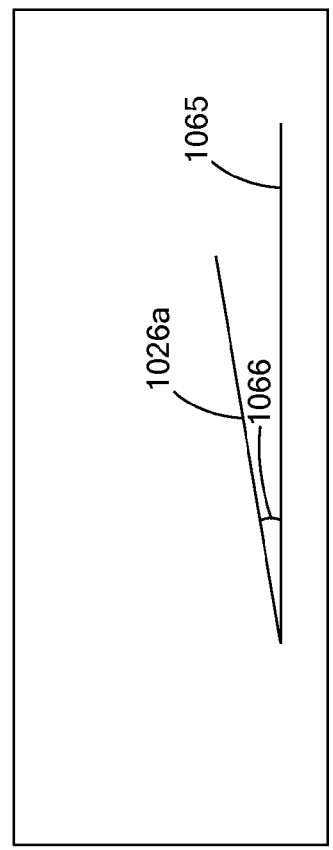
FIG. 1C is a schematic showing an embodiment of a laser beam path angle in accordance with the present inventions.

Turning to FIG. 1C there is shown a schematic illustrating the laser beam path angle 1066. The laser beam path angle 1066 is the angle that is formed between the laser beam path 1026*a* (as the beam path leaves the laser tool 1000) and a horizontal, i.e., level, line 1065. Preferably, the laser beam path angle should be greater than 0°, greater than about 5°, greater than about 10°, greater than about 15°, greater than about 30° and may even be greater; and more preferably may be from about 10° to about 40° and still more preferably may be from about may be from about 15° to about 25°.

Having a laser beam path angle greater than zero, in conjunction with the laser beam power and other beam properties allows for the laser beam to penetrate deeply into a target material, e.g., the earth, rock, hard rock, and concrete. The laser beam can penetrate over 1 foot into a target material, e.g., hard rock, at least about 2 feet, at least about 5 feet, at least about 10 feet, at least about 50 feet and at least about 100 feet and more. Generally, the laser beam upon striking the work surface of the target material heats and melts that material (vaporization may also take place, and as discussed further below, spallation and thermal-mechanical cracking may also arise as a result of the laser heating of the target material, as well as other laser-thermal-mechanical phenomena, changes or transitions). Because the beam angle is greater than 0° the laser beam forms a hole in the target material that has a slope, i.e., down toward the work surface and up into the target material. Thus, the molten material can flow down and out of the hole, clearing the hole so that the laser beam is continually striking the bottom or end of the hole, melting and thus removing additional target material and lengthening the hole.

Figure 2:
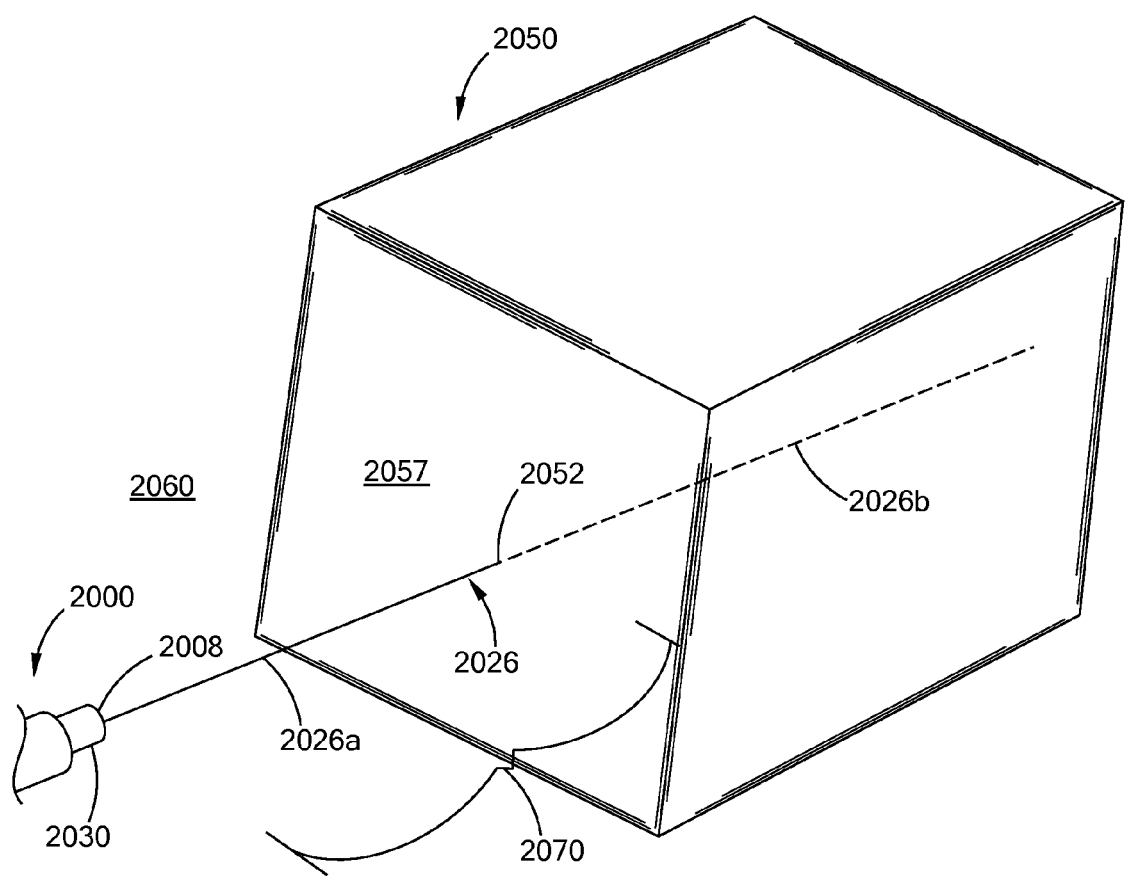
FIG. 2 is a perspective view of an embodiment of a laser tool and a target material in accordance with the present inventions.

Turning to FIG. 2 there is shown a portion of a laser tool 2000, having a laser discharge opening 2008 in the tool face end 2030. The laser beam path 2026 leaves the tool face 2030 and intersects the surface 2057 of target material 2050 at point 2052. The laser beam path 2026 then extends beneath the work surface 2057 and into the target material 2050. The stand off distance shown by bracket 2070, is the distance between the face 2030 of the tool 2000 and the work surface 2057 at the point 2052 where the beam path 2026 intersects the work surface 2057. The beam path may be viewed as having two portions. A first portion 2026*a*, extending from the tool face 2030 to the surface 2057 of the target material 2050, where the beam path is in free space 2060; and, a second portion 2026*b* where the beam path is within the target material. In the embodiment of FIG. 2, the target material is shown as a freestanding block of material. It should be understood that the target material may not be freestanding, or may only be partially freestanding, e.g., the target material could be the earth, a surface in a borehole in the earth, a seam of ore or mineral containing rock, a rock face at the end of a tunnel, a rock face in a deep mine, a rock face in a quarry, a quarried piece of rock, or the roof of a deep mine.

In general it is preferred that the optimum portion of the laser beam, e.g., beam waist 1064 of FIG. 1, be positioned on the work surface, e.g., 2057 of FIG. 2. Thus, and for example, the distance from the end of the tool to the end of the beam waist, e.g., 1063 of FIG. 1B, could be the same or essentially the same as the stand off distance, e.g., 2070 of FIG. 2. In this example, the laser beam would tend to form a hole that has an increasing diameter with depth. More preferably, for forming deep penetrations into the target material, the focal point of the laser beam is located at the work surface. Thus, the stand off distance, e.g., 2070 of FIG. 2 and the distance from the end of the tool to the focal point, e.g., 1062 of FIG. 1B would be the same or essentially the same; and similarly, the point where the beam path first contacts the work surface, e.g., 2052 of FIG. 2 and the focal point of the beam, e.g., 1060 of FIG. 1B would be the same or essentially the same. Still more preferably, for forming deep penetrations into the target material, the proximal end, e.g., 1064*a* of the beam waist 1064 of FIG. 1B, is located at the work surface, e.g., 2057 of FIG. 2. Thus, the stand off distance, e.g., 2070 of FIG. 2 and the distance from the end of the tool to the proximal end of the beam waist, e.g., 1067 of FIG. 1B would be the same or essentially the same; and similarly, the point where the beam path first contacts the work surface would be the widest point, or essentially, the widest point of the laser beam waist. It being understood that many other relative positions of the focal point, the laser beam optimum cutting portion, the beam waste, and the point where the laser beam path initially intersects the work surface may be used. Thus, for example, the focal point may be about 1 inch, about 2 inches, about 10 inches, about 15 inches, about 20 inches, or more above (e.g., away from) or below (e.g., within) the work piece surface. For example, in mining applications the standoff distance may be three feet from the face of the rock and the laser beam may have a six-foot focal length.

Figure 13:
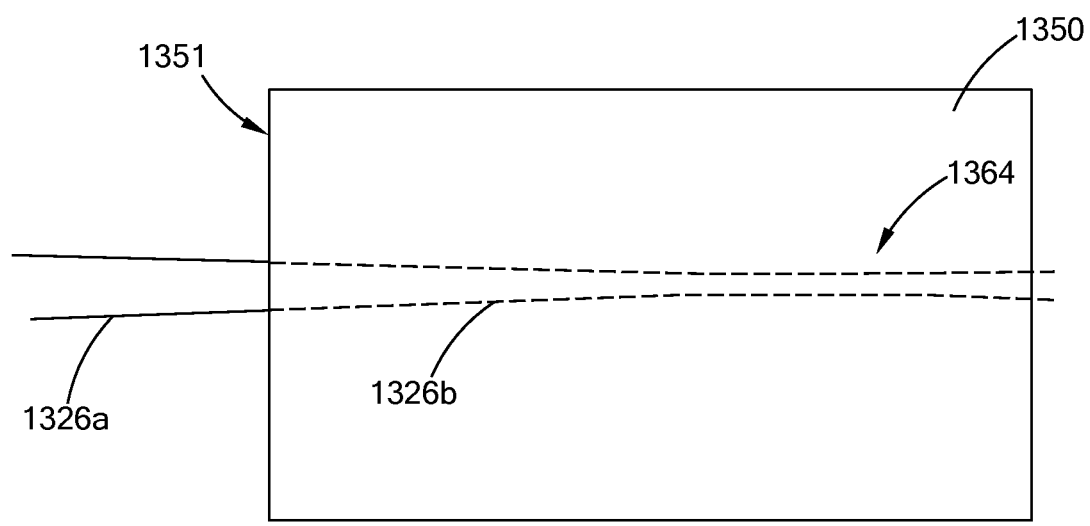
FIG. 13 is a side cross sectional schematic view of an embodiment of the positioning of the laser beam waist in a target material in accordance with the present inventions.

The beam waist in many applications is preferably in the area of the maximum depth of the cut. In this manner the hole opens up toward the face (from surface), which further helps the molten material to flow from the hole. This effect is further shown in FIG. 13. In FIG. 13 there is shown the laser beam having a laser beam path 1326a in free space and a laser beam path 1326b in the target material 1350. The laser beam 1326a strikes the front face 1351 of the target material 1350. The beam waist 1364 is positioned within the target material 1350 behind the face 1351. Further this preferred positioning of the beam waist may also provide high rates of penetration.

Figure 3A:
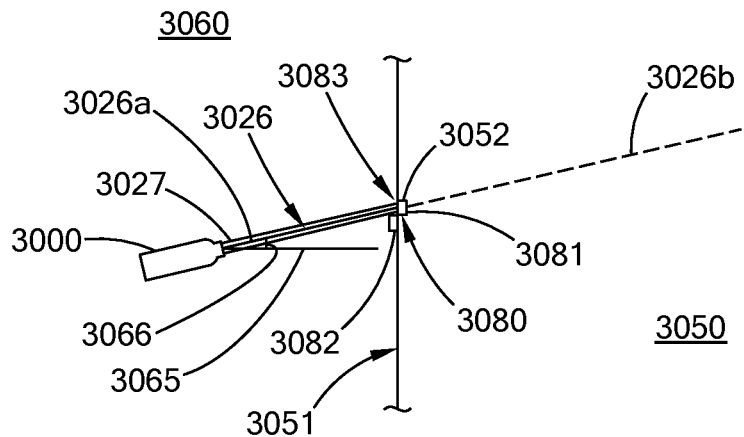
FIGS. 3A to 3C are side cross sectional snap shot views of an embodiment of a laser operation in accordance with the present inventions.
Figure 3B:
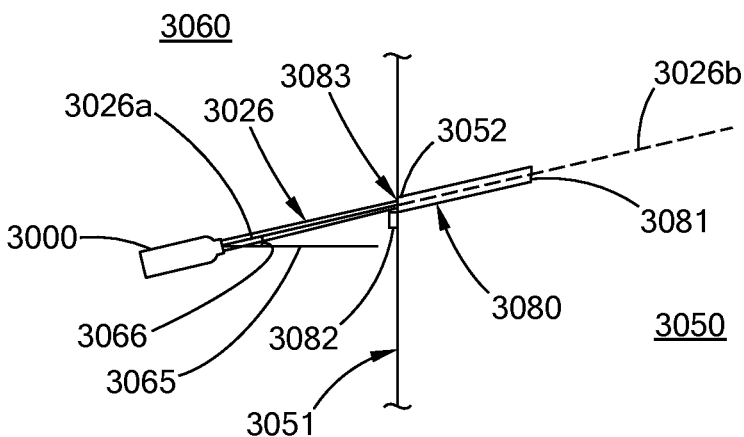
Figure 3C:
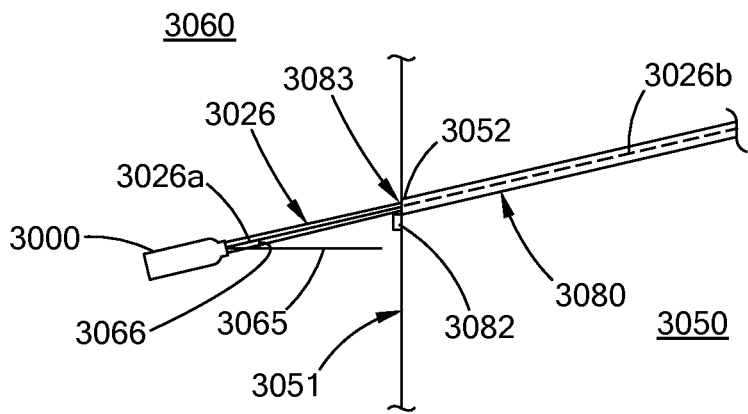

Turning to FIG. 3A through 3C there are provided side cross-sectional schematic snap shot views of an embodiment of a laser operation forming a hole, or perforation, into a target material. Thus, turning to FIG. 3A, in the beginning of the operation the laser tool 3000 is firing a laser beam 3027 along laser beam path 3026, and specifically along section 3026a of the beam path. Beam path section 3026a is in free space 3060 that has ambient air present. The laser beam path 3026 has a 16° beam path angle 3066 formed with horizontal line 3065. The laser beam path 3026 and the laser beam 3027 traveling along that beam path intersect the face 3051 of target material 3050 at spot 3052. In this embodiment the proximal end of the laser beam waist section is located at spot 3052. The hole or perforation 3080 is beginning to form, as it can be seen that the bottom, or distal, surface 3081 of the hole 3080 is below surface 3051, along beam path 3026b, and within the target material 3050. As can be seen from this figure the hole 3080 is forming with a downward slope from the bottom of the hole 3081 to the hole opening 3083. The molten target material 3082 that has flowed from the hole 3080 cools and accumulates below the hole opening 3083.

Turning to FIG. 3B the hole 3081 has become longer, advancing deeper into the target material 3050. In general, the hole advances along beam path 3026a. Thus, the bottom 3081 of the hole is on the beam path 3026b and deeper within the target material, e.g., further from the opening 3083, than it was in FIG. 3A.

Turning now to FIG. 3C the hole 3081 has been substantially advanced to the extent that the bottom of the hole is no longer visible in the figure. The amount of molten material 3082 that has flowed from the hole 3081 has continued to grow. In this embodiment the length of hole 3082 is substantially longer than the length of the beam waist. The diameter, or cross sectional size of the hole, however does not increase as might be expected in the area distal to the beam waist. Instead, the diameter remains constant, or may even slightly decrease. It is theorized, although not being bound by this theory, that this effect occurs because the optical properties of the hole, and in particular the molten and semi-molten inner surfaces of the hole, are such that they prevent the laser beam from expanding after it is past, i.e., distal to, the beam waist. Further, and again not being bound by this theory, the inner surfaces may absorb the expanding portions of the laser beam after passing through the waist, the inner surfaces may reflect the expanding portions of the laser beam, in effect creating a light pipe within the hole, or the overall conditions within the hole may create a waveguide, and combinations and variations of these. Thus, the depth or length of the hole can be substantially, and potentially many orders of magnitude greater than the length of the beam waist.

In general, the airflow within the tool preferably is sufficient to keep the distal end of the optics package and of the tool clear of debris and dirt from the environment. The airflow may also be used for cooling the optical package, optical components or other portions of the tool. A separate fluid, gas, or other type of cooling or thermal management system may be employed with the tool depending upon such factors as laser power, likely stand off distances, and environment temperatures, e.g., if the target material is a glacier in Antarctica compared to a rock face deep within an underground gold mine. For example, air flows of from about 15 scfm to about 50 scfm, about 20 scfm to about 40 scfm, about 20 scfm, and about 30 scfm can be utilized. Greater air flows may be used, but may not be necessary to cool and keep the optics clean. Ambient air from a compressor, bottled or compress air, nitrogen or other gasses may be used. Preferably the gas is clean, and substantially free from, or free from, any grease, oil or dirt that could adversely effect the optics when the laser beam is being propagated.

Figure 4:
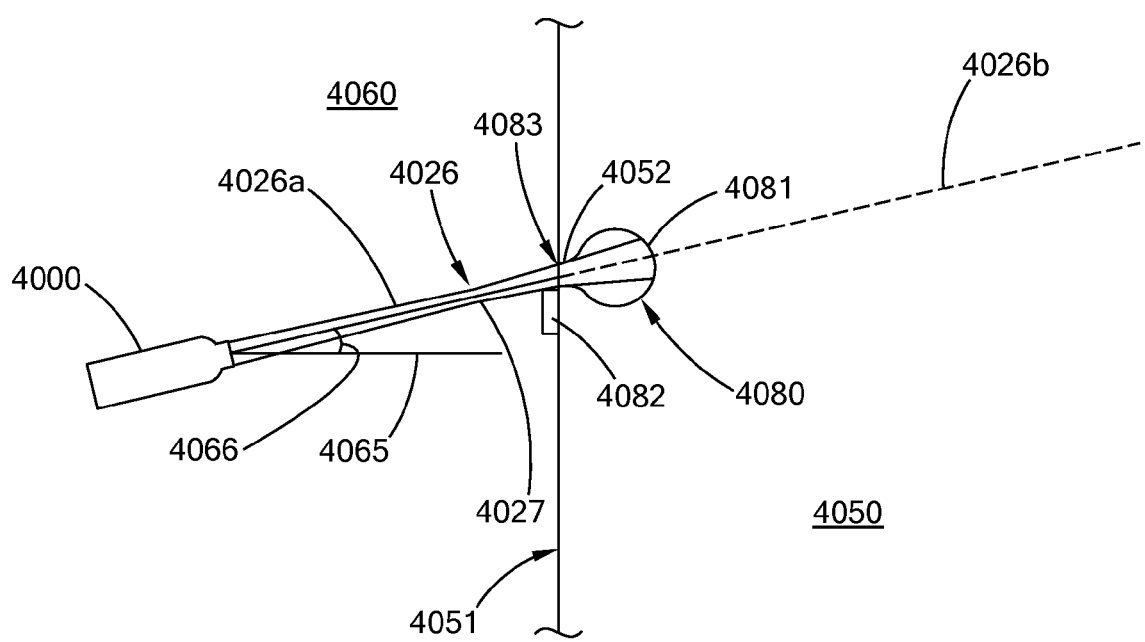
FIG. 4 is a side cross sectional snap shot view of an embodiment of a laser operation in accordance with the present inventions.

Turning to FIG. 4 these is provided a schematic showing an embodiment of a laser operation in which the distal end of the beam waist is positioned away from the work surface of the target material. The laser tool 4000 is firing a laser beam 4027 along laser beam path 4026, which may be considered as having two section 4026a and 4026b. Beam path section 4026a is in free space 4060 that has ambient air present, and beam path 4026b is within the target material 4050. The laser beam path 4026 has a 22° beam path angle 4066 formed with horizontal line 4065. The laser beam path 4026 and the laser beam 4027 traveling along that beam path intersect the surface 4051 of target material 4050 at location 4052. In this embodiment the distal end 4064b of the laser beam waist section is not on location 4052 and is located away from surface 4051. In this embodiment the hole or perforation 4080 forms but then reaches a point where the bottom of the hole 4081 will not advance any further along the beam path 4026b, e.g., the hole stops forming and will not advance any deeper into the target material 4050. Further, unlike the operation of the embodiment in FIGS. 3A to 3C, the hole 4080 does not have a constant or narrowing diameter as one looks from the opening 4083 to the bottom 4081 of the hole 4080. The molten target material 4082 that has flowed from the hole 4080 cools and accumulates below the hole opening 4083. Based upon the laser beam power and other properties, this embodiment provides the ability to have precise and predetermined depth and shaped holes, in the target material and to do so without the need for measuring or monitoring devices. Once the predetermined depth is achieved, and the advancement process has stopped, regardless of how much longer the laser is fired the hole will not advance and the depth will not increase. Thus, the predetermined depth is essentially a time independent depth. This essentially automatic and predetermined stopping of the hole's advancement provides the ability to have cuts of automatic and predetermined depths, and well as, to section or otherwise remove the face of a rock formation at a predetermined depth in an essentially automatic manner.

It should be further noted that once this self limiting depth control has occurred, the laser tool can be moved closer to the material and then have the process continue to advance the hole until the new self limiting depth is reached, at which if desired the tool could be move close, and this may be repeated until the tool is essentially upon the face of the target material.

Figure 5A:
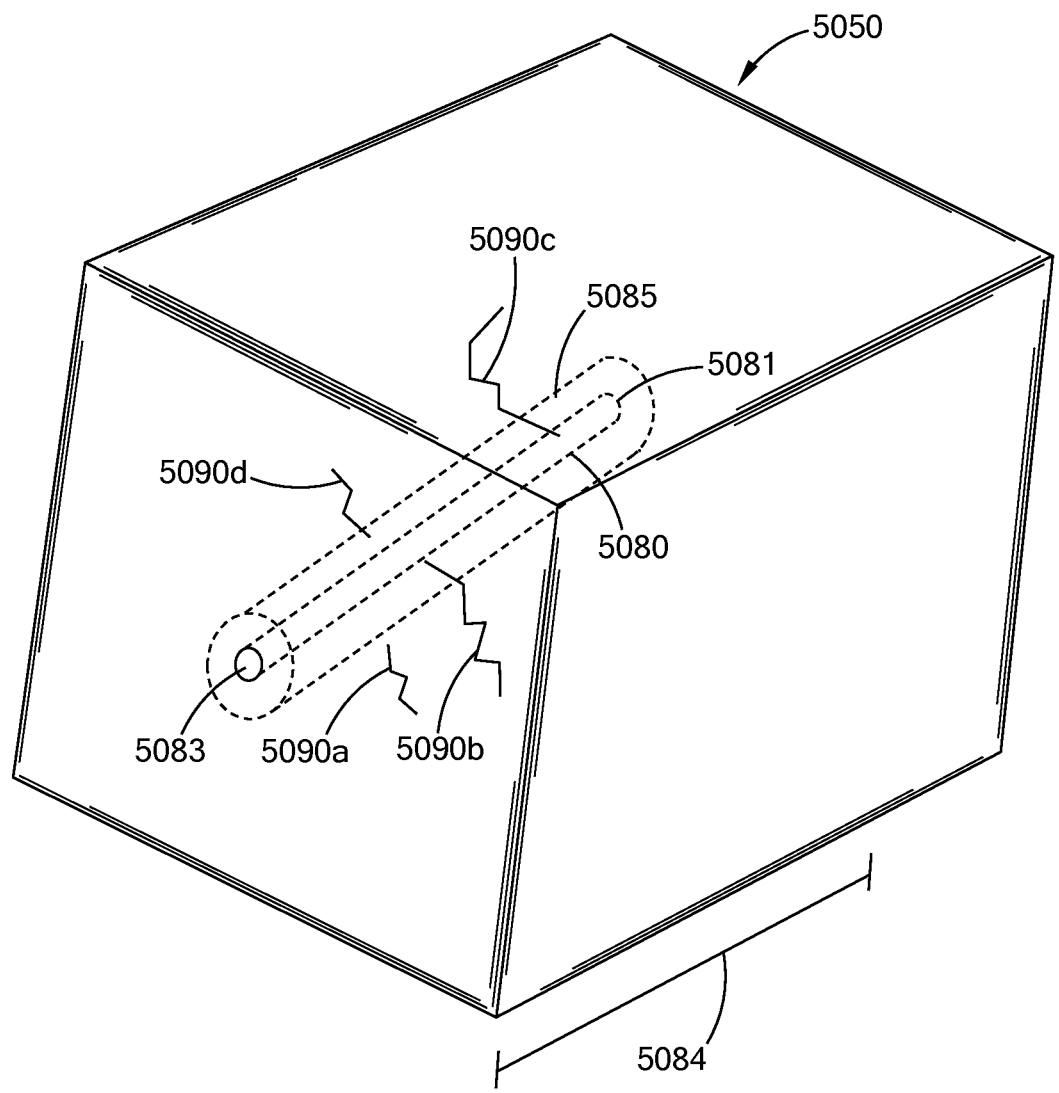
FIG. 5A is a perspective schematic view of an embodiment of a laser pattern for a target material in accordance with the present inventions.
Figure 5B:
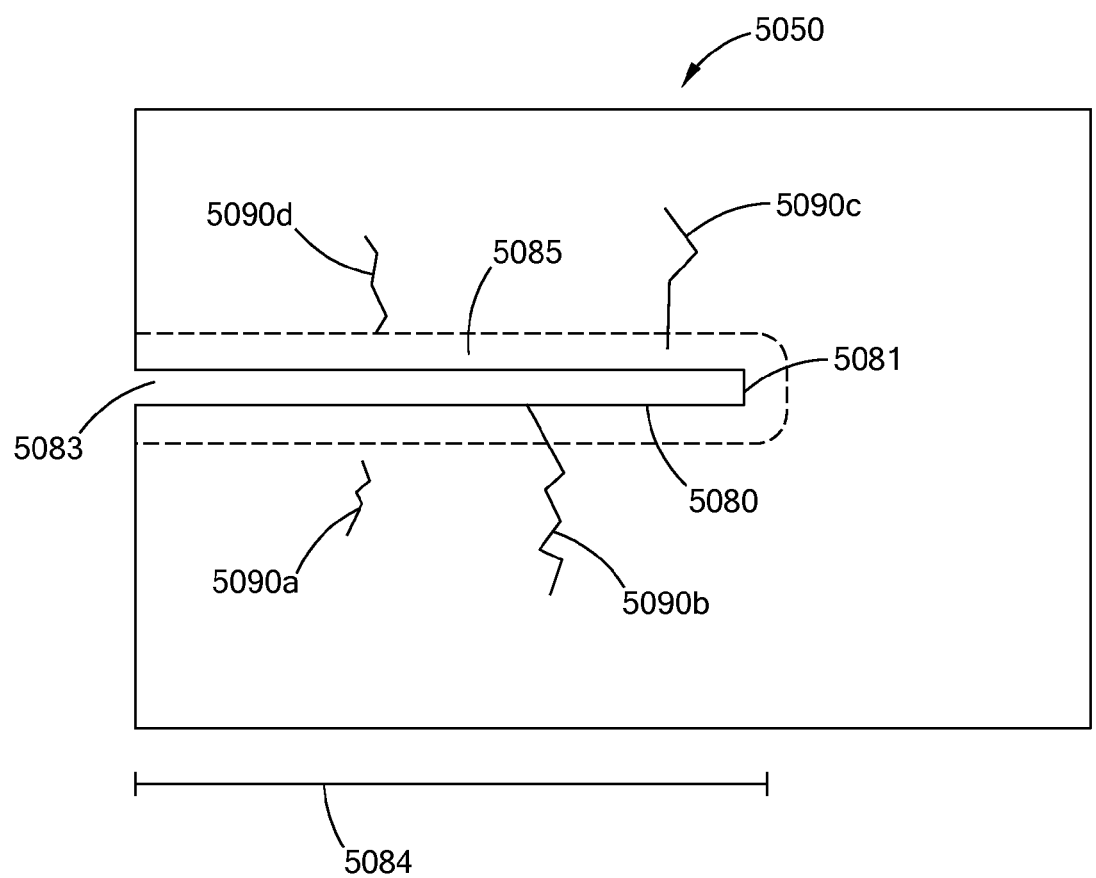
FIG. 5B is a side cross sectional view of the embodiment of FIG. 5A.

Turning to FIGS. 5A and 5B there are shown in FIG. 5A a prospective view a target material 5050, and in FIG. 5B a cross sectional view of the target material 5500. The target material 5050 is shown as being freestanding, e.g., a block of material, for the purpose of clarity in the figure. It should be understood that the target material may not be freestanding, or may only be partially freestanding, e.g., the target material could be the earth, a surface in a borehole in the earth, a seam of ore or mineral containing rock, a rock face in a quarry, a quarried piece of rock, a rock face at the end of a tunnel, a rock face in a deep mine, or a roof of a deep mine. A laser cut hole 5080 extends into the target material 5050 from the hole opening 5083 to the back of the hole 5081. Around the hole 5080 is an area 5085 of laser affected target material. In this area 5085 the target material is weakened, substantially weakened, or essentially structurally destroyed. The laser affected material may fall apart on its own, or may be removed by the application of mechanical forces, such as by a water jet, an air jet, a mechanical scraper, or a hammer and preferably only requires very small forces. For example if the target material is a rock having a hardness of about 40 kpsi, then the laser affected rock or area of laser affected rock may have a hardness of less than about 20 kpsi, less than about 10 kpsi, and less than about 5 kpsi. Additionally, the laser cutting process forms cracks or fractures, i.e., laser induced fracturing, in the target material. By way of example, fracture 5090a is an independent fracture and does not extend to, or into, the laser affected area 5085, the hole 5080 or another fracture. Fracture 5090b extends into and through the laser affected area 5085 into the hole 5081. Additionally, fracture 5090b is made up of two associated cracks that are not fully connected. Fracture 5090c extends to, and into, the laser affected area 5085 but does not extend to the hole 5080. Fracture 5090d extend to, but not into the laser affected area 5085.

The fractures 5090a, 5090b, 5090c and 5090d are merely schematic representation of the laser induced fractures that can occur in the target material, such as rock, earth, rock layer formations and hard rocks, including for example granite, basalt, sandstone, dolomite, sand, salt, limestone, ores, minerals, overburden, marble, rhyolite, quartzite and shale rock. In the target material, and especially in target materials that have a tendency, and a high tendency for thermal-mechanical fracturing, in a 10 foot section of laser cut hole there may be about 10, about 20, about 50 or more such fractures, and these fractures may be tortious, substantially linear, e.g., such as a crack along a fracture line, interconnected to greater and lessor extents, and combinations and variations of these. These laser fractures may also be of varying size, e.g., length, diameter, or distance of separation. Thus, they may vary from micro fractures, to hairline fractures, to total and extended separation of sections having considerable lengths.

The depth or length of the hole can be controlled by determining the rate, e.g., inches/min, at which the hole is advanced for a particular laser beam, configuration with respect to the work surface of the target material, and type of target material. Thus, based upon the advancement rate, the depth of the hole can be predetermined by firing the laser for a preset time.

The rate and extent of the laser fracturing, e.g., laser induced crack propagation, may be monitored by sensing and monitoring devices, such as acoustical devices, acoustical geological sensing devices, and other types of geological, sensing and surveying type devices. In this manner the rate and extent of the laser fracturing may be controlled real time, by adjusting the laser beam properties based upon the sensing data.

In doing assays of a formation, for example, to determine a mineral or precious metal content, a laser hole can be cut into the face of the formation and advanced into the formation to a predetermined depth, for example 100 feet. Samples of the molten material flowing from the hole can be taken at set time intervals, which would correspond to set distances from the face (based upon the advancement rate for the hole). The molten sample can be analyzed at the location or solidified and stored, for later analysis. In this manner, if a series of holes are laser cut into the rock face at predetermined intervals an analysis of the entire formation can be performed. For example, since the laser can be used to melt the target material, e.g., a rock, it is also possible to collect the molten rock in for example a crucible. By keeping the rock molten for a few minutes, (the laser may be used for this purpose, a second laser may be used, or conventional heaters, e.g., flame, electric, may be used) the heavier desired metal, e.g., gold, silver, copper, and other heavy metals can sink to the bottom of the crucible giving the operator a real time method for assaying the potential of the formation. The laser can also be used to melt a predetermined surface or volume of rock for the purpose of assaying the formation independent of any drilling or cutting process. The spectral emissions from the laser rock process may also be used to determine the presence of trace elements. In this example, preferably a sophisticated spectral analysis technique, known to those of skill in the spectral analysis arts, can be employed, to sort out the spectral signatures of the desired or sought after materials that may be buried in the background blackbody radiation signal.

Cuts in, sectioning of, and the volumetric removal of the target material can be accomplished by delivering the laser beam energy to the target material in preselected and predetermined energy distribution patterns. These patterns can be done with a single laser beam, or with multiple laser beams. For example, these patterns can be: a linear cut; a circular cut; a spiral cut; a pattern of connected cuts; a pattern of connected linear cuts, such as a grid pattern, a pattern of radially extending cuts, e.g., spokes on a wheel; a circle and radial cut pattern, e.g., cutting pieces of a pie and cutting around the pie pan; a pattern of spaced apart holes, such as in a line, in a circle, in a spiral, or other pattern, as well as other patterns and arrangements. The patterns, whether lines, staggered holes, others, or combinations thereof, can be traced along a feature of the target material, such as, a geologic feature of a formation, a boarder of an ore seam, or a joint in a structure. The patterns can be traced along a feature intended to be created in the target material, such as a side wall or roof of a tunnel or shaft. The forgoing are illustrative examples of the types and nature of laser cuts, sectionings and volumetric removals that the can be performed; and that additional, other, varied, as well as combinations and variations of the forgoing are contemplated. Additionally, the timing and sequence of the creation of the holes, cuts and volumetrically removed sections, can be predetermined to enhance, and take advantage, the laser fracturing of the target material, as well as the laser affected zones in the material. The predetermined timing sequence can also provide the ability to enhance other non-laser operations that may be taking place before, after or in conjunction with the laser operations.

Thus, for example, in determining a laser beam delivery pattern to provide a predetermined and preselected laser beam energy distribution pattern, the spacing of cut lines, or staggered holes, in the target material, preferably may be such that the laser affected zones are slightly removed from one another, adjacent to one another but do not overlap, or overlap only slightly. In this manner, the maximum volume of the target material will be laser affected, i.e., weakened, with the minimum amount of total energy.

It is further believed that when comparing the energy delivered from the present laser operations, as compared to conventional blasting using explosives, substantially less energy is being used. Further, the present laser operations avoid the peripheral environment damage, and structural damage to surround structures, e.g., homes and business, that may occur from the use of explosive in mining, quarrying, tunneling and construction activities. The present inventions provide a further benefit by eliminating risk to personnel from the use and handling of explosives; thus eliminating the need to vacate all personnel during the mining operation. Unlike explosive use, the use of the present laser operations may not require the clearing of large areas and the stopping of other operations, while the cutting and fracturing operations are ongoing.

Preferably, when the laser tool is configured for performing a laser operation on a target material the laser beam path from the front of the tool to the surface of target material should be isolated. This may be accomplished by the use of a barrier that prevents the laser light from escaping or from reaching the location where personnel may be present. For example the laser beam path may be isolated by using a light weight metal tube, having an internal diameter that is large enough to not interfere with the laser beam, that is optically sealed to the laser tool, i.e., no laser light can escape, and that extends from the laser tool to the work surface, where it is optically sealed to the work surface. It may be isolated by using a temporary, semi-permanent or permanent shielding structure, e.g., stands holding welding blankets or other light blocking materials, a scaffold supporting light blocking materials, a telescoping or extendable housing that is placed over the beam path or more preferably the tool and the beam path. It may also be isolated by constructing a temporary, semi-permanent or permanent barrier to optically isolate the beam path, and more preferably to isolate the tool, the work surface and the target material from personnel, e.g., a temporary barrier in a tunnel, optically sealing against the tunnel walls, behind the laser tool as it is advancing the tunnel face. The enclosure or shield may also be made from laser safe glass, e.g., glass that does not transmit, or substantially does not transmit light in the wavelength of the laser beam, or have window having such glass in them.

Turning to FIG. 6A to 6D there is shown an embodiment of an adjustable optics package that may be used in a laser cutting tool. FIG. 6 is a perspective view of the adjustable optics package 6024 with a laser beam 6027 being propagated, e.g., fired, shot, delivered, from the front (distal) end 6025 of the optics package 6024. The optics package 6025 has an adjustment body 6028 that has a fixed ring 6029. The adjustment body 6029 is adjustably, e.g., movably, associated with the main body 6031 of the optics package 6024, by threaded members. There is also a locking ring 6032 on the adjustment body 6025. The locking ring 6025 is engageable against the main body to lock the adjustment body 6028 into position.

A preferable configuration, and use, for an adjustable optics package will be for use with a 300 m optic system so that the beam waist can be driven, e.g., advanced forward by changing focal length, into the borehole as the borehole advances.

Figure 6A:
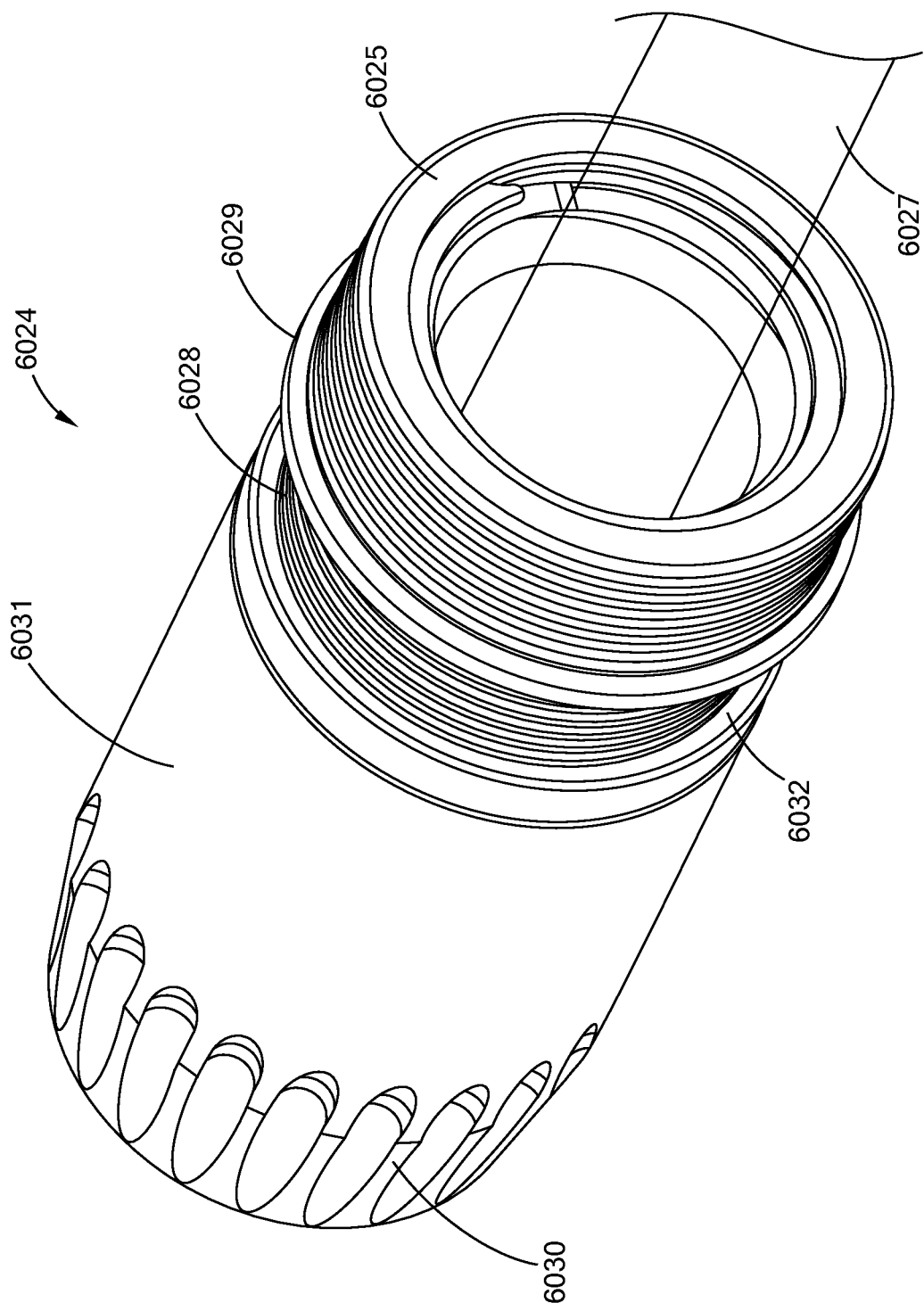
FIGS. 6A to 6D are views of an embodiment of an optics package in accordance with the present inventions.
Figure 6B:
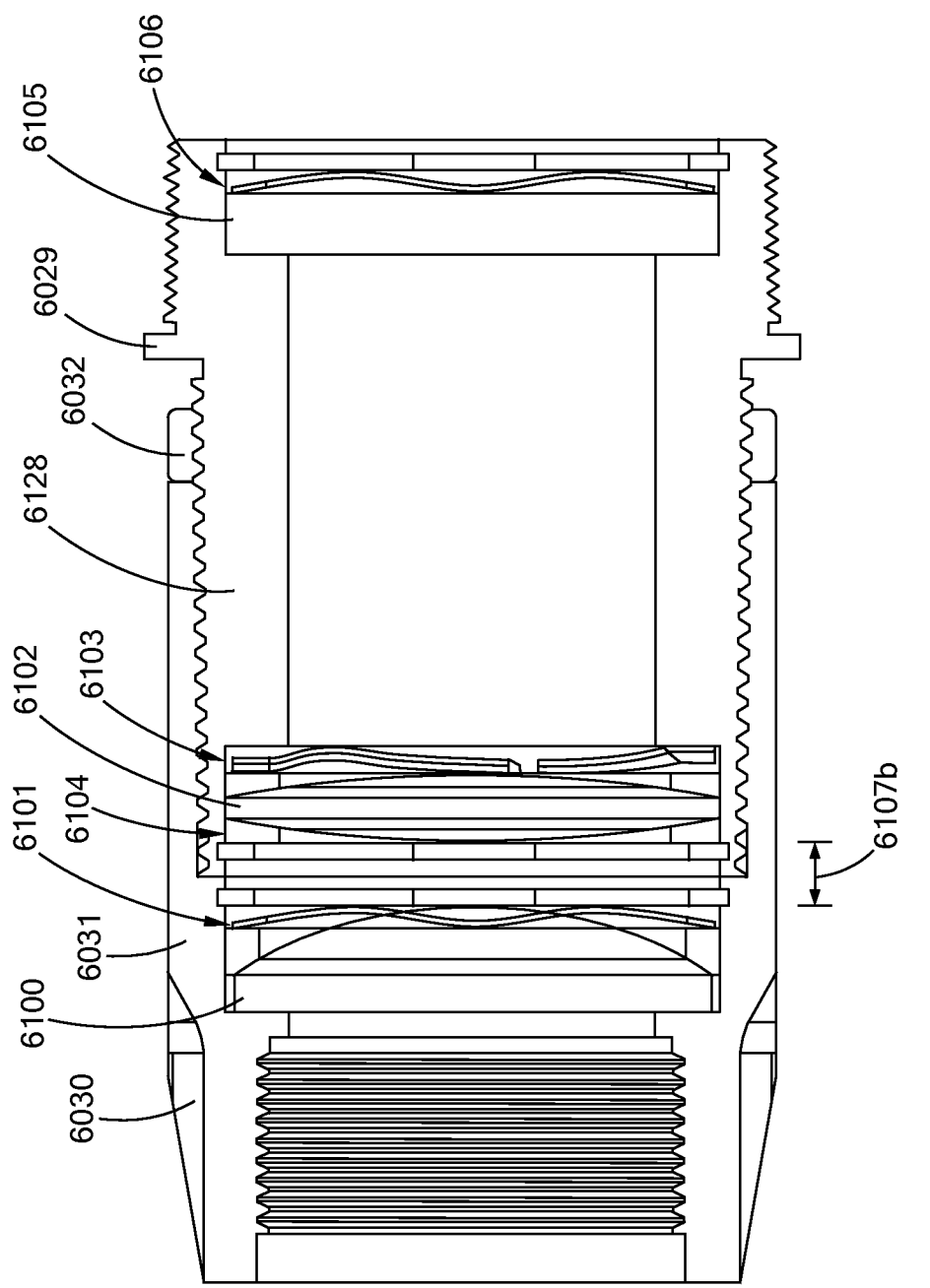
Figure 6C:
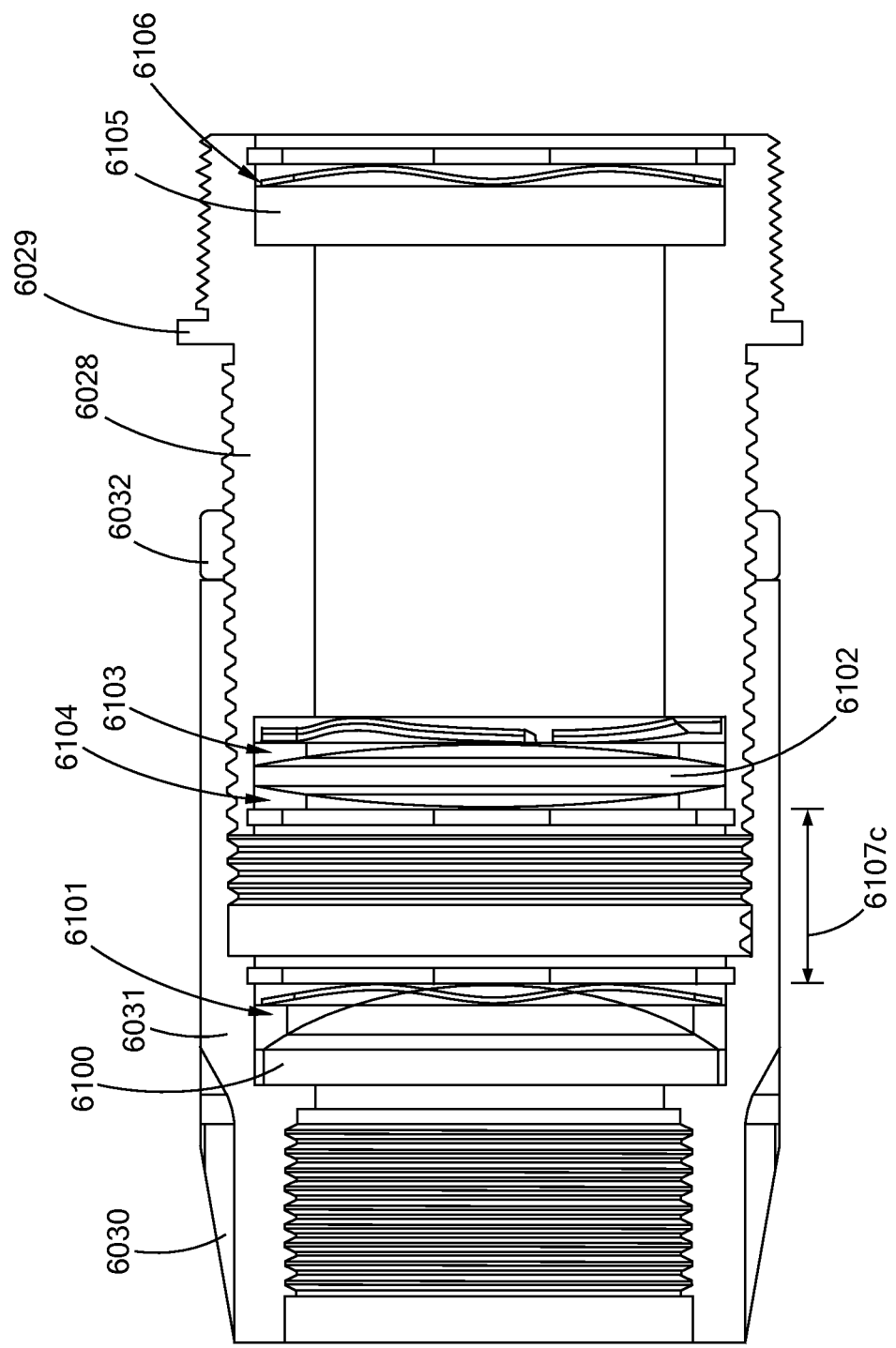
Figure 6D:
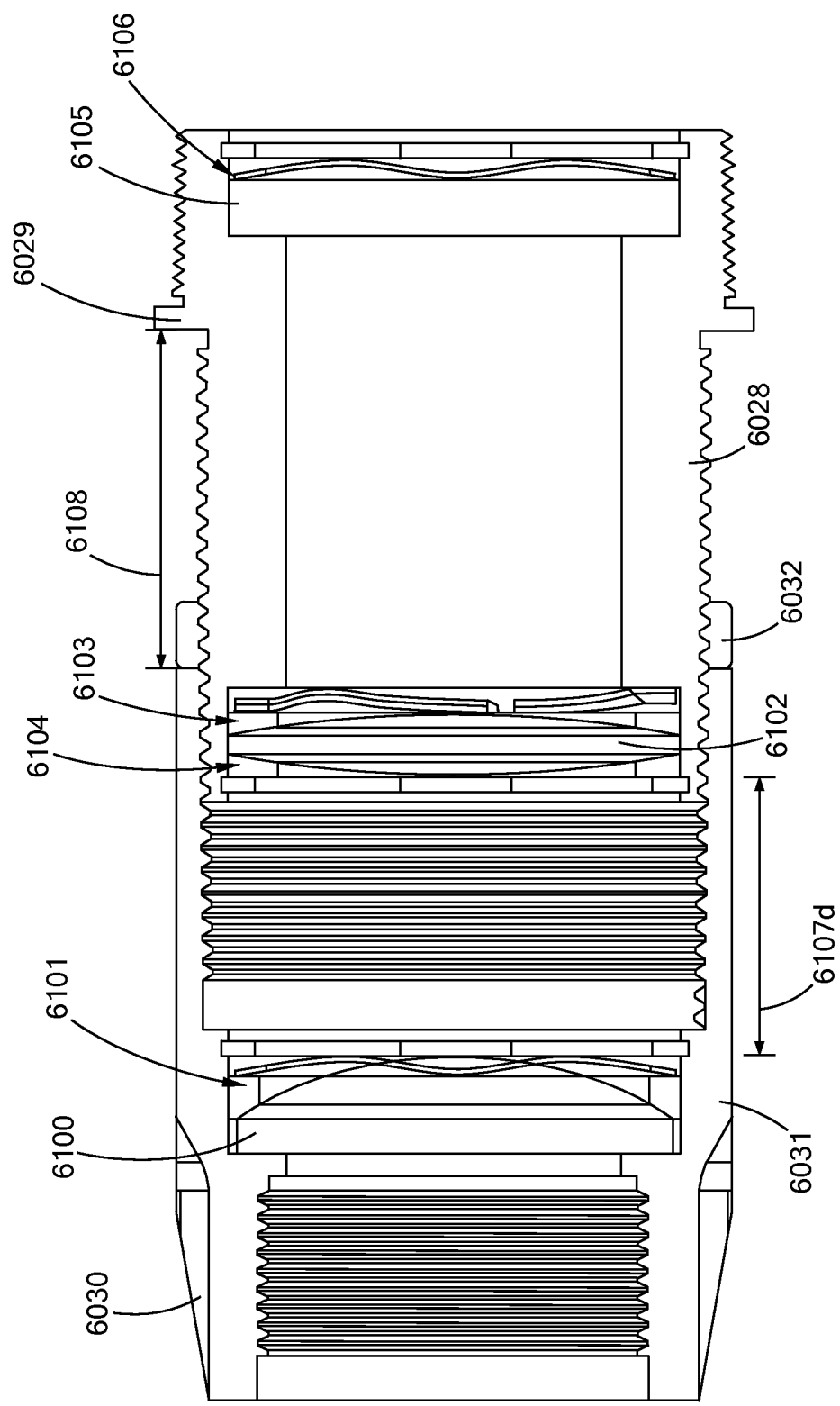

Turning to FIGS. 6B to 6D, there are shown cross sectional views of the embodiment of FIG. 6A in different adjustment positions. Thus, there is provided a first focusing lens 6100, which is held in place in the main body 6031 by lens holding assembly 6101. Thus, lens 6100 is fixed, and does not change position relative to main body 6031. A second focusing lens 6102 is held in place in the adjustment body 6028 buy holding assemblies 6103, 6104. Thus, lens 6102 is fixed, and does not change position relative to the adjustment body 6028. Window 6105 is held in place in the front end 6025 of the adjustment body 6028 by holding assembly 6106. In this manner as the adjustment body 6028 is moved in and out of the main body 6031 the distance, e.g., 6107*b*, 6107*c*, 6107*d*, between the two lens 6100, 6102 changes resulting in the changing of the focal length of the optical system of the optics package 6024. Thus, the optical system of optics package 6024 can be viewed as a compound optical system.

In FIG. 6B the two lenses 6100, 6102 are at their closest position, i.e., the distance 6107*b* is at its minimum. In FIG. 6C the two lenses 6101, 6102 are at a middle distance, i.e., the distance 6107*c* is at about the mid point between the minimum distance and the maximum distance. In FIG. 6D the two lenses 6101, 6102 are at their furthest operational distance, i.e., the distance 6107*d* is the maximum distance that can operationally be active in the optics assembly. (It should be noted that although the adjustment body 6028 could be moved out a little further, e.g., there are a few threads remaining, to do so could compromise the alignment of the lenses, and thus, could be disadvantages to the performance of the optics package 6024.)

Figure 9:
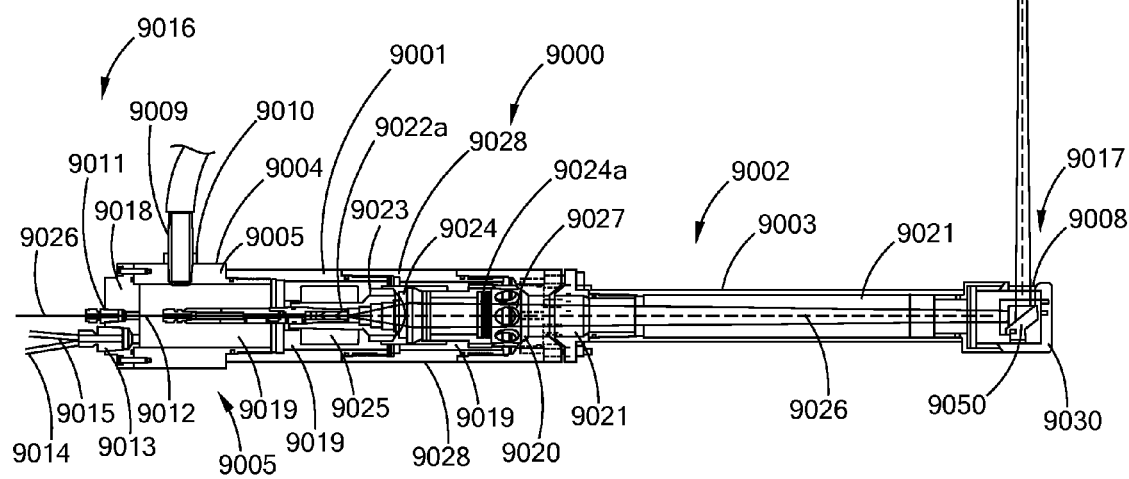
FIG. 9 is a cross sectional view of an embodiment of a long stand off distance high power laser cutting tool in accordance with the present invention.

In the embodiment of FIG. 9, there is provided a schematic cross section of a right angle cutting tool 9000 that may be useful, for example in perforating borehole side walls for the purpose of increase the production of hydrocarbons or the flow of a geothermal heat source into the borehole, or that may be used to cut pipe, or any other structure or target material that is not axially aligned with the tool body. The cutting tool 9000 has a gas inlet section body 9005, has a gas inlet line 9009 and connector 9010, for securing the gas inlet line 9009 to the gas inlet section body 9005. The gas inlet section body 9005 has a back end piece 9018, which has a fitting 9011 for an optical fiber cable 9012. The back end piece 9018, also has an auxiliary fitting 9013 for data line 9014, and data line 9015. There is a gas flow passage 9019 that channels the gas from the gas inlet line 9009 along the length of the tool, around the exterior of a series of optical components. The gas flow is then transitioned, by gas flow carryover section 9020, from a location exterior to the optical components to gas flow passage 9021, which is positioned in, on and associated with the laser beam path 1026, where the gas then exits the optics section body 9028 travels along beam tube 9003 in beam tube section 9002 to prism section 9030, having TIR prism 9050, and exits through the distal end 9017 of the tool 9000 through opening 9008. The gas flow passage 9019 is within the gas inlet section body 9005 and the optics section body 9028 of the tool 9000. The optical section body 9028 is made of up several bodies that are threaded together. The back end of the optical section body 9028 is connected by a threaded connection to the front end of the gas inlet section body 9005. The front end of optical section body 9028 is attached by threaded members, e.g., bolts, to the laser discharge section body 9003.

Generally, the various body sections of the tool 9000 may be separate components or they may be integral. They may be connected by any means available that meets the use requirements for the tool. Preferably, the tool, as assembled, should be sufficiently rigid to withstand anticipated vibration and mechanical shocks so that the optical components will remain in optical alignment. The tool body, body section, the beam tube and the prism section may be made from a single component or tube, it may be made from two, three or more components that are fixed together, such as by threaded connections, bolts, screws, flanges, press fitting, welding, etc. Preferably, the tool, as assembled, should meet the anticipated environmental conditions for an intended use, such as temperature, temperature changes, moisture, weather conditions, and dust and dirt conditions. The tool body, body sections, and beam tube, and prism sections may be made from metal, composite materials, or similar types of materials that provide the requisite performance capabilities.

The optical fiber cable 9012 extends into the gas inlet section body 1005 and the gas flow passage 9019. The optical fiber cable 9012 is optically and mechanically associated with optical connector 9022, which is positioned in optical connector receptacle 9023. The optical connector receptacle has a plurality of fins, e.g., 9025, which extend into gas flow passage 9019, and which provide cooling for the optical connector 9022 and the optical connector receptacle 9023. The laser beam path is represented by dashed line 9026, and extends from within the core of the optical fiber cable 9012 to a potential target or work surface. (The totality of the optical path would start at the source of the laser beam, and extend through all optical components, and free space, that are in the intended path of the laser beam.) At the distal end 9022a of optical connector 9022, the laser beam path 9026 is in free space, e.g., no solid components are present, and travels from the distal connector end 9022a to the optics package 9024, where the laser beam is optically manipulated to predetermined laser beam parameters for providing long stand off distance capabilities. The laser beam path 9026 exits the distal end 9024a of the optics package 9024, and travels in free space in the flow carry over section 9020, in the front section of the optical section body 9028, and into beam path tube section 9003 which has beam tube 9003, and enters TIR prism 9050 where it is reflected at a right angle, exiting through opening 9008. In operation the laser beam 9027 would be propagated by a laser, e.g., a source of a laser beam, and travel along the laser beam path 9026. The TIR (total internal reflection) prism 9050 is of the type taught and disclose in U.S. Patent Application Ser. No. 61/605,434 the entire disclosure of which is incorporated herein by reference, and which can be configured to provide other angles in addition to 90°.

Other types of reflective mirrors may be used. Thus, the mirror may be any high power laser optic that is highly reflective of the laser beam wavelength, can withstand the operational pressures, and can withstand the power densities that it will be subjected to during operation. For example, the mirror may be made from various materials. For example, metal mirrors are commonly made of copper, polished and coated with polished gold or silver and sometime may have dielectric enhancement. Mirrors with glass substrates may often be made with fused silica because of its very low thermal expansion. The glass in such mirrors may be coated with a dielectric HR (highly reflective) coating. The HR stack as it is known, consists of layers of high/low index layers made of $SiO_2$, $Ta_2O_5$, $ZrO_2$, $MgF$, $Al_2O_3$, $HfO_2$, $Nb_2O_5$, $TiO_2$, $Ti_2O_3$, $WO_3$, $SiON$, $Si_3N_4$, $Si$, or $Y_2O_3$ (All these materials would work for many wave lengths, including 1064 nm to 1550 nm). For higher powers, such as 50 kW actively cooled copper mirrors with gold enhancements may be used. It further may be water cooled, or cooled by the flow of the gas. Preferably, the mirror may also be transmissive to wavelengths other than the laser beam wave length. In this manner an optical observation device, e.g., a photo diode, a camera, or other optical monitoring and detection device, may be placed behind it.

In the embodiment of the tool in FIG. 9, the distance between the TIR prism and the distal end 1024a of the optics package can be about greater than 1 cm, greater than about 10 cm, greater than about 100 cm, and greater than about 1,000 cm depending in part upon the focal lengths, which for example could be greater than about 100 cm, greater than about 1,000 cm, and greater than about 2,000 cm.

The nozzles or distal end opening of the tools may have opens of about 1 cm diameter for a focusing optic with a short focal length to 40 cm diameter for the long focal length optics assemblies.

In addition to moving or scanning the laser beam, or the laser cutting head to create a pattern on the target material, the optics then self, or in combination with scanning or movement, can be used to create custom and predetermined patterns, such as, e.g., a matrix of spaced spots or a grid pattern.

EXAMPLES

The following examples are provide to illustrate various devices, tools, configurations and activities that may be performed using the high power laser tools, devices and system of the present inventions. These examples are for illustrative purposes, and should not be view as, and do not otherwise limit the scope of the present inventions.

Example 1

A laser pattern is delivered to a target material from a stand off distance of about 30 feet. A laser cutting tool of the general type shown in FIG. 1A is mounted on a robot arm, the focal length of the tool is set at 1,000 mm. Once positioned at the stand off distance from the target material, the robot arm adjusts the position of the laser tool so that the proximal end of the laser beam waist will be at the desired depth from the work surface of target material when the laser beam is fired. The laser tool is connected to a fiber laser system capable of providing a 40 kW laser beam. The fiber laser system provides a multimode continuous laser beam having a wavelength of about 1070 nm. The laser tool is connected to the fiber laser system by way of an optical fiber having a core of about 300 µm, a conventional water cooled connector is used to launch the laser beam into the focusing optical elements of the optics package of the laser tool. The connector at the end of the fiber has an NA of 0.22 at the laser beam launch face (distal end) of the connector. The laser beam when fired may have a φ of about 4 cm, at 40 kW, and 3.2 $kW/cm^2$ at the proximal surface of the proximal focusing lens in the optics package. The optics package contains a lens configured to correct for aberrations in the beam path introduced by other elements in the optics package and along the laser beam path.

Example 2

Figure 7B:
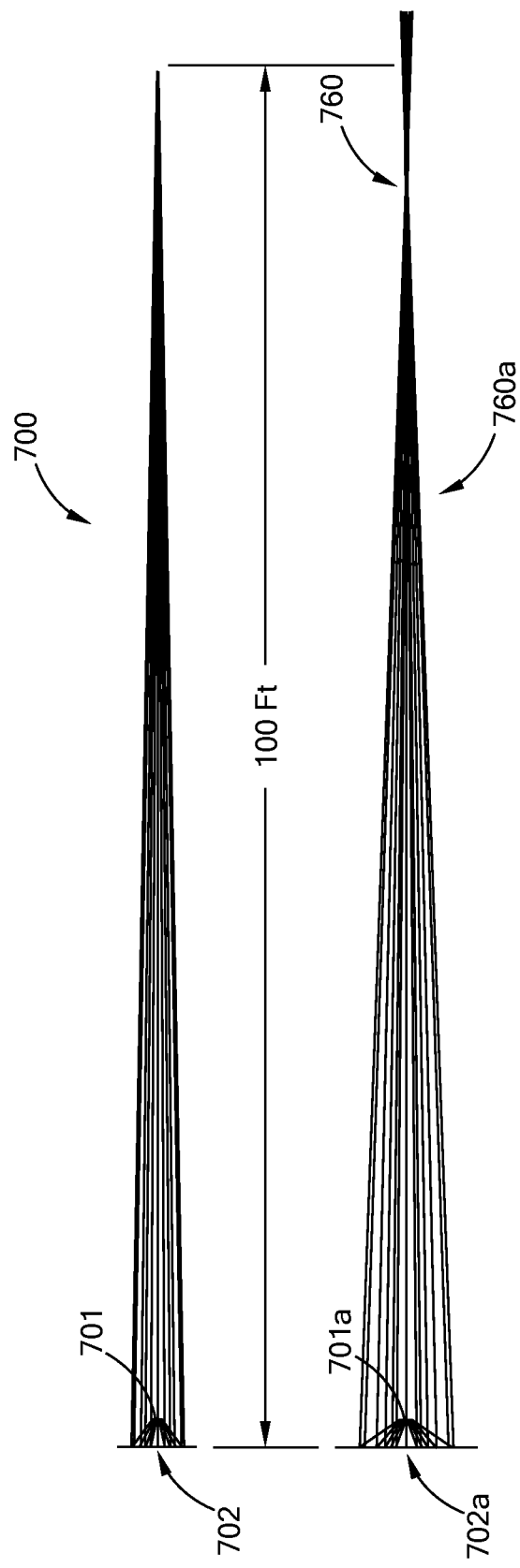
FIG. 7B are cross sectional views of the embodiment of FIG. 7A.
Figure 7C:
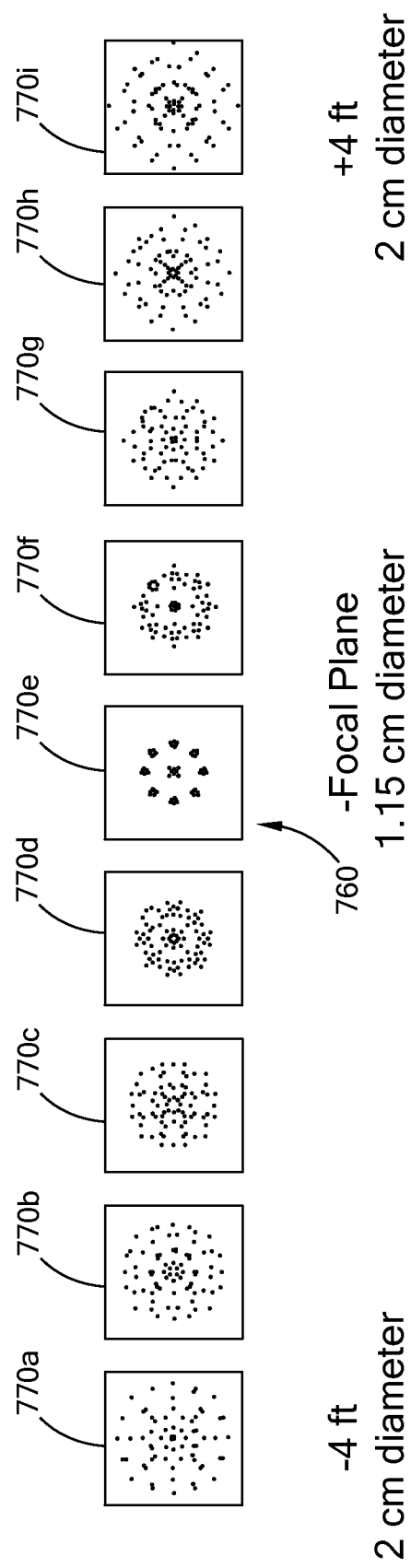
FIG. 7C is a series of laser beam patterns along cross sections of the laser beam waist of the embodiment of FIG. 7A.

An embodiment of an optics assembly for providing a high power laser beam for cutting and drilling a target material from a stand off distance of 100 feet is provided in FIGS. 7A to 7C. Turning to FIG. 7A there is shown a perspective schematic view of an optics assembly having two mirrors 701, 702, which their reflective surfaces facing each other. A high power laser cable 703 having a single optical fiber having a core of about 200 µm extends through the center of mirror 702 to a beam launch assembly 704. The NA of the distal face of the beam launch assembly is 0.22. The beam launch assembly 704 launches a high power laser beam, having 20 kW of power in a pattern shown by the ray trace lines, to a secondary mirror 701. The secondary mirror 701 is located 11 cm from the launch or distal face of the beam launch assembly 704. The secondary mirror 701 has a diameter of 2" and has its convex reflective surface facing proximally, i.e., toward the distal end of the laser launch assembly 704. The secondary mirror has a radius of curvature 143 cm. The laser beam, as shown by the ray trace lines, is directed proximally, and focused (negative focus) away from the secondary mirror 701, in a manner in which the laser beam passes around, e.g., past the laser launch assembly 704. As shown in the FIGS. 7A and 7B, the laser beam, as shown by the ray trace lines, travels from the second mirror to the primary mirror 702. (FIG. 7B is a cross sectional view and ray trace diagram of the laser beam and beam path 700. In FIG. 7B the vertical dimension has been enlarged to better see the ray lines of the beam and beam path 700a, thus enlarged primary mirror 702a, enlarged secondary mirror 701a, and the focal plane 760 are shown.) The primary mirror has its concave reflective surface facing distally, i.e., toward the secondary mirror 701. The primary mirror 702 has a diameter of 18" and a radius of curvature of 135 cm. The laser beam, as shown by the ray trace lines, is directed and focused away from the primary mirror 702, in a manner in which the laser beam passes around, e.g., past the secondary mirror 701. In this manner the laser beam is launched from the launch assembly 704 in a diverging or expanding beam profile, where it strikes the convex surface of the secondary mirror 701, and is directed back proximally past the launch assembly 704 (without striking it), leaving the secondary mirror 701 the beam continues to be in a diverging or expanding beam profile, until it strikes the primary mirror 702. The primary mirror is shaped, based upon the incoming beam profile, to provide for a focal point 100 feet from the face the primary mirror.

Turning to FIG. 7C, there is shown the laser beam delivery pattern of the assembly of FIG. 7A, along various points in the beam waist. The patterns 770a to 770i show cross sections of the laser beam, e.g., a spot, taken at various axial locations along the laser beam path, e.g., the length of the laser beam. These cross sections show the pattern within the laser beam shot if the beam were to strike a target at that location in the laser beam path. Thus, pattern 770a is four feet away from the focal plane 760 in a direction toward the optics (e.g., 996 along the beam path). The beam patterns 770a, 770b, 770c, 770d, 770e, 770f, 770g, 770h, 770i are taken along the beam waist moving away from the launch face of the optics to a location 770i that is four feet from the focal plane (e.g., 104 feet along the beam path from the focusing lens). The laser beam delivery profile 770e provides for a very tight spot in the focal plain 760, the spot having a diameter of 1.15 cm. Moving in either direction from the focal plane 760, along the beam waist, it can be seen that for about 4 feet in either direction (e.g., an 8 foot preferred, e.g., optimal, cutting length of the laser beam) the laser beam spot size is about 2 cm, 770a, 770i. For cutting rock, it is preferable to have a spot size of about ¾" or less (1.91 cm or less) in diameter (for laser beam having from about 10 to 40 kW).

Example 2a

Figure 14A:
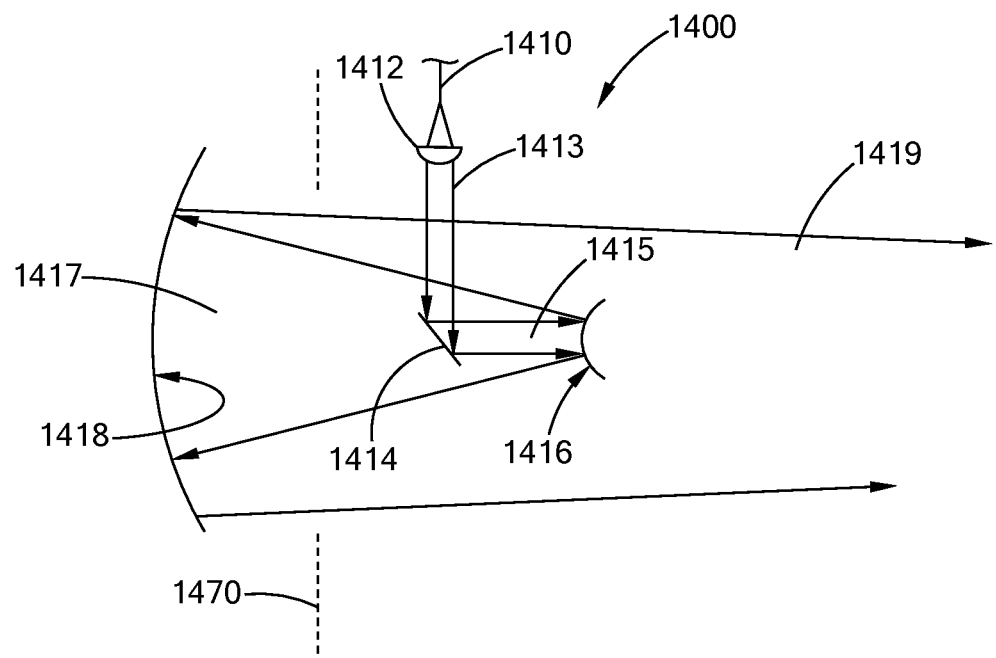
FIGS. 14A and 14B are cross sectional and side schematic views, respectively, of an embodiment of a two lens long distance laser optics assembly in accordance with the present inventions.
Figure 14B:
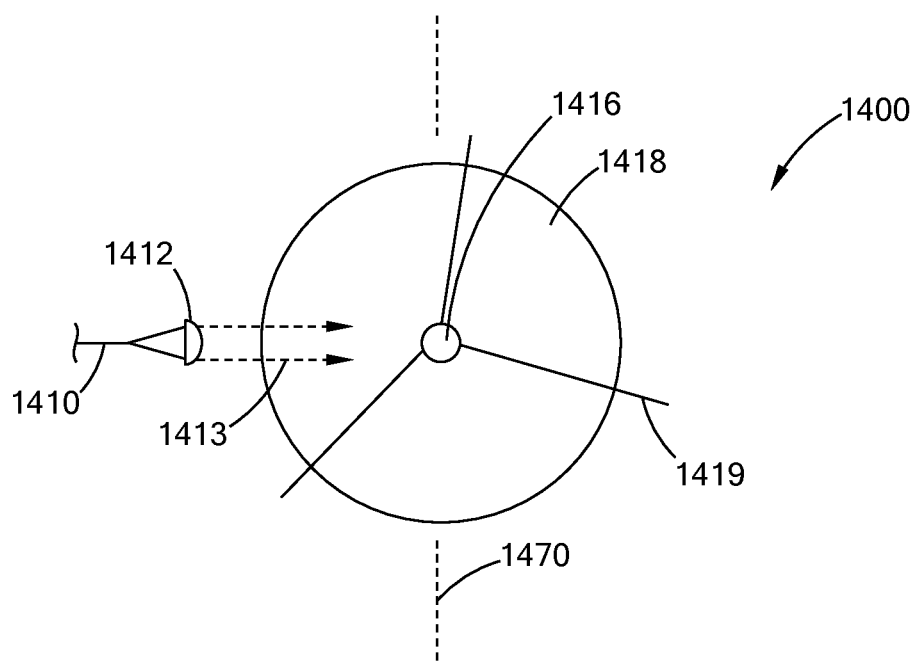

Turning to FIGS. 14A and 14B there is shown an embodiment of a divergent, convergent lens optics assembly for providing a high power laser beam for creating deep holes, perforations and cuts, having depths, e.g., distances from the face of the target material, of greater than 10 feet, greater than about 20 feet, greater than about 50 feet, and greater than 100 feet.

FIG. 14A provides a side view of this optics assembly 1400, with respect to the longitudinal axis 1470 of the tool. FIG. 14B provides a front view of optics assembly 1400 looking down the longitudinal axis 1470 of the tool. As best seen in FIG. 14A, where there is shown a side schematic view of an optics assembly having a fiber 1410 with a connector launch a beam into a collimating lens 1412. The collimating optic 1412 directs the collimated laser beam along beam path 1413 toward reflective element 1414, which is a 45° mirror assembly. Reflective mirror 1414 directs the collimated laser beam along beam path 1415 to diverging mirror 1416. Diverging mirror 1416 directs the laser beam along diverging beam path 1417 where it strikes primary and long distance focusing mirror 1418. Primary mirror focuses and directs the laser beam along the operational, e.g., cutting, laser path 1429 toward the face of the target material e.g., a rock face, quarry face, cement and/or target (not shown) to be cut. Thus, the two mirrors 1416, 1418, have their reflective surfaces facing each other. The diverging (or secondary) mirror 1416 supports, e.g., 1419 are seen in FIG. 14B.

In an example of an embodiment of this optical assembly, the fiber may have a core of about 200 µm, and the NA of the connector distal face is 0.22. The beam launch assembly (fiber 1410/connector) launches a high power laser beam, having 20 kW of power in a pattern shown by the ray trace lines, to a secondary mirror 1416. The diverging mirror 1416 is located 11 cm (as measured along the total length of the beam path) from the launch or distal face of the beam launch assembly. The secondary mirror 1416 has a diameter of 2" and a radius of curvature 143 cm. For distances of about 100 feet the primary mirror 1418 has a diameter of 18" and a radius of curvature of 135 cm. In this embodiment the primary mirror is shaped, based upon the incoming beam profile, to provide for a focal point 100 feet from the face of the primary mirror. This configuration can provided a very tight spot in the focal plain, the spot having a diameter of 1.15 cm. Moving in either direction from the focal plane, along the beam waist, for about 4 feet in either direction (e.g., an 8 foot optimal cutting length of the laser beam) the laser beam spot size is about 2 cm. For cutting rock, it is preferable to have a spot size of about ¾" or less (1.91 cm or less) in diameter (for laser beam having from about 10 to 40 kW). In an example of an embodiment during use, the diverging mirror could have 2 kW/cm² and the primary mirror could have 32 W/cm² of laser power on their surfaces when performing a laser perforation operation.

Example 2b

In this embodiment a 20 kW laser beam is launched into the laser optics assembly of the embodiment of Example 2, the secondary mirror would have 1 kW/cm² and the primary mirror would have 16 W/cm².

Example 2c

In this embodiment a 40 kW laser beam is launched into the laser optics assembly of the embodiment of Example 2, the secondary mirror would have 2 kW/cm² and the primary mirror would have 32 W/cm².

Example 2d

In this embodiment a 40 kW laser beam is launched into the laser optics assembly of the embodiment of Example 2a, the diverging (secondary) mirror would have 2 kW/cm² and the primary mirror would have 32 W/cm².

Example 2e

In this embodiment 3 optical assemblies of the configuration of Example 2a are used, with a separate fiber each providing a 20 kW laser beam to the assemblies. The three assemblies are positioned to direct three laser beams into a 2 cm² spot, having a combined power of about 60 kW at a distance of 100 feet from the tool.

Example 2f

In this embodiment 3 optical assemblies of the configuration of Example 2a are used, with a separate 200 μm core fiber, each providing a 40 kW laser beam to the assemblies. The three assemblies are positioned to direct three laser beams into a 2 cm² spot, having a combined power of about 120 kW at a distance of 100 feet from the tool.

Example 3

Figure 8:
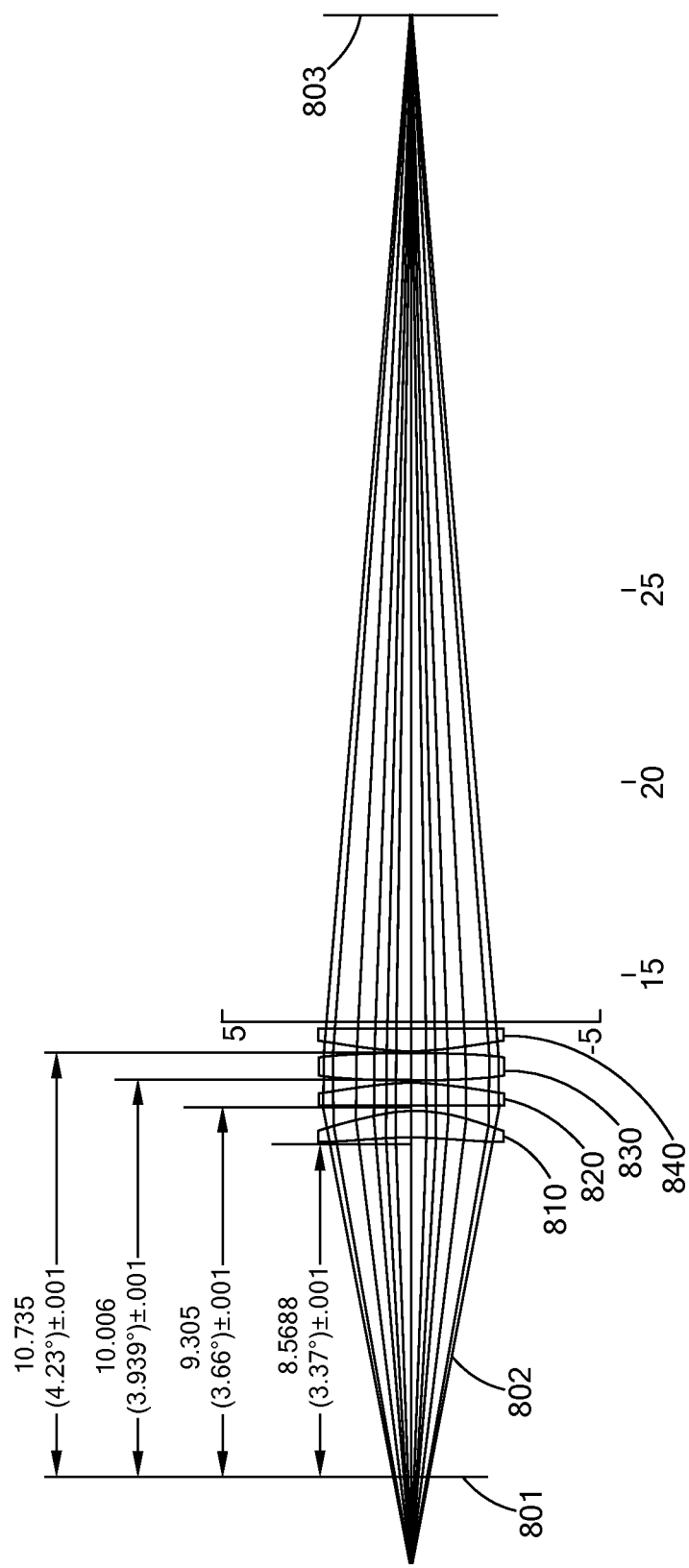
FIG. 8 is a cross sectional view of an embodiment of an optics assembly of the present inventions.

Turning to FIG. 8, there is shown a schematic of an embodiment of an optical assembly for use in an optics package, having a launch face 801 from a connector, ray trace lines 802 show the laser beam exiting the face of the connector and traveling through four lens, lens 810, lens 820, lens 830, lens 840. In this embodiment lens 810 minimizes the aberrations for the lens 810-820 combination, which combination collimates the beam. Lens 830 and 840 are the focusing lenses, which focus the laser beam to a focal point on focal plane 803. Lens 840 minimizes the spherical aberrations of the 830-840 lens pair. The distances from the launch face 801 of the connector to the various lens are set forth in FIG. 8.

Differing types of lens may be used, for example in an embodiment Lens 830 has a focal length of 500 mm and lens 840 has a focal length of 500 mm, which provide for a focal length for the optics assembly of 250 mm. The NA of the connector face is 0.22. Lens 810 is a meniscus (f=200 mm). Lens 820 is a plano-convex (f=200 mm). Lens 830 is a plano-convex (f=500 mm). Lens 840 is a menisus (f=500 mm).

Example 4

In an embodiment of the assembly of FIG. 8, only one focusing lens is used, lens 840. Lens 830 has been removed from the optical path. All other lens and positions remain unchanged, providing for a focal length for the beam of 500 mm.

Example 5

In an embodiment of the assembly of FIG. 8, lens 830 has a 1,000 mm focus and a diameter of 50.8 mm and lens 840 is not present in the configuration, all other lens and positions remain unchanged, providing for an optical assembly that has a focal length of 1,000 mm.

Example 6

Figure 12:
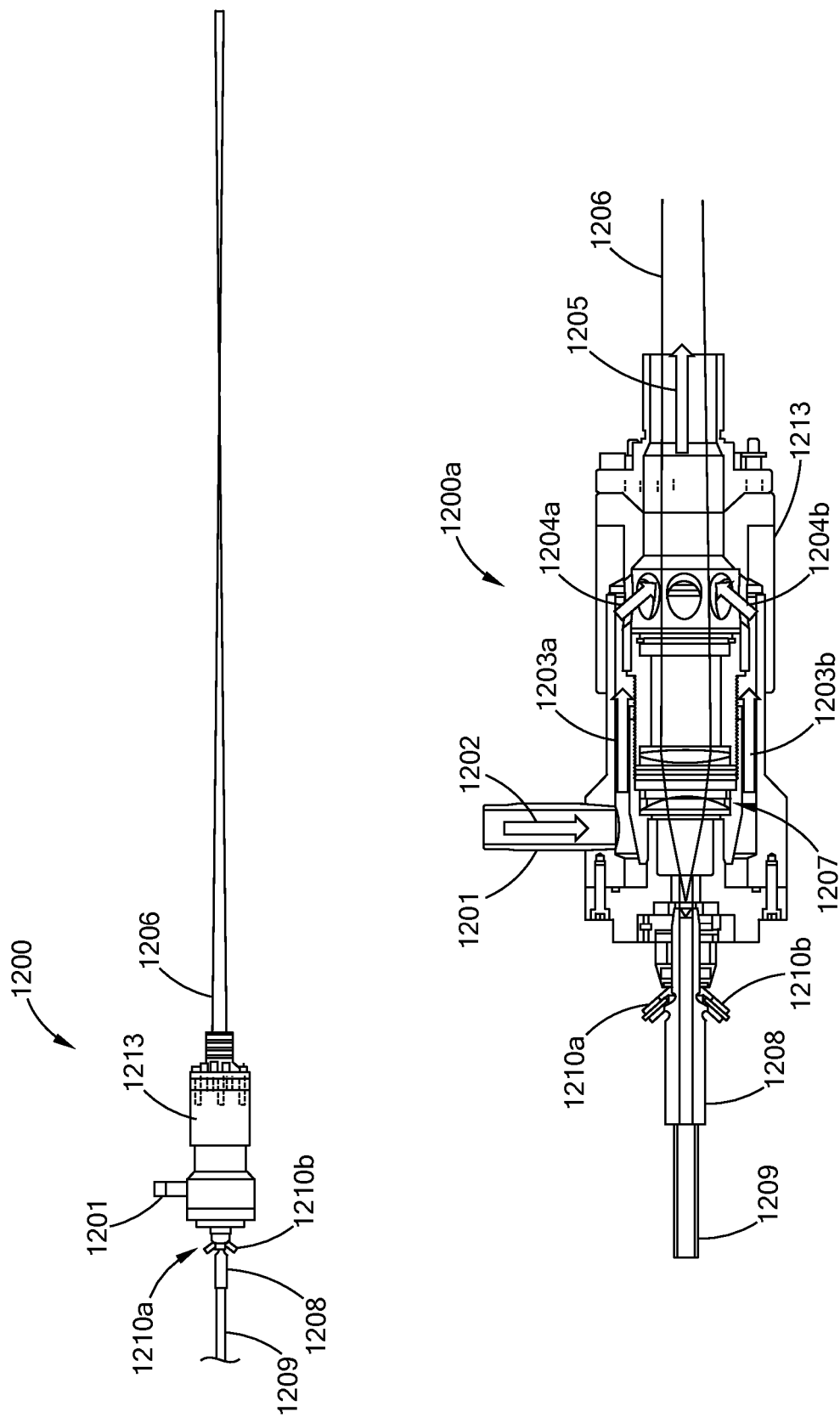
FIG. 12 is a prospective side view, and an enlarged cross sectional side view of an embodiment of a laser cutting tool in accordance with the present inventions.

The embodiment of FIG. 12, has the lens configurations and types of the embodiment of FIG. 8, and has an actively cooled connector, for example a commercially available water-cooled QBH connector. Thus, a perspective view 1200 and a cross sectional view 1200a of the tool are shown in FIG. 12. The tool has a body 1213, an air or gas inlet 1201, a high power laser conveyance structure 1209 for providing the laser beam to the tool and optically connecting the tool with the laser, and a water cooled connector 1208, having inlet 1210a and outlet 1210b for water cooling lines. The tool has an optics package, or assembly, 1207. The laser beam 1206 is launched from the face of the connector 1208 and travels through the optics assembly 1207 and out of the tool's distal end. The flow of the gas through the tool is shown by arrows 1202, 1203a, 1203b, 1204a and 1204b.

Example 7

In this embodiment the lens configuration and types of the embodiment of FIG. 8 are used and the connector is a passively cooled connector of the type disclosed and taught in U.S. patent application Ser. No. 13/486,795.

Exhibit 8

In an embodiment of the optics assembly of the FIG. 8, the lens configuration has a focal length in the 10 foot range (3,500 mm).

Example 9

In this embodiment the lens configuration of FIG. 7A has a focal length in the 50 foot range.

Example 10

Figure 10A:
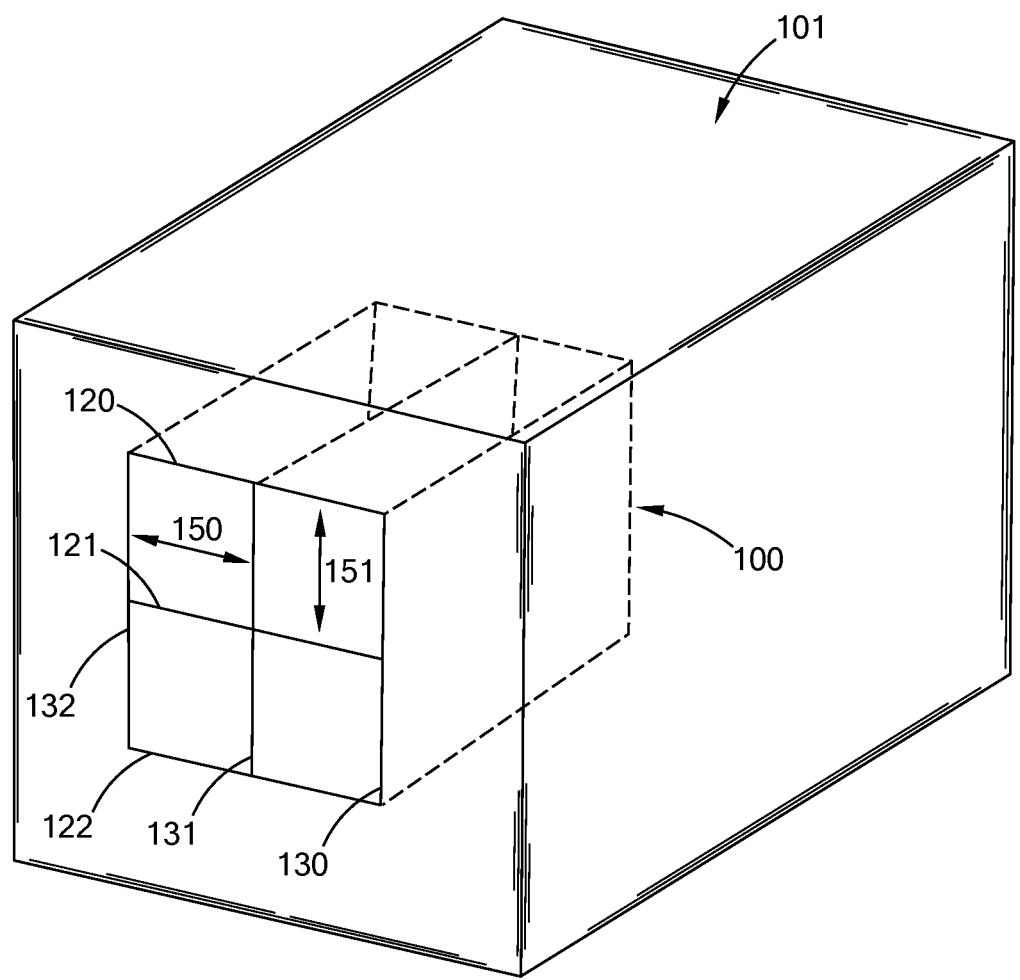
FIG. 10A is a perspective schematic view of an embodiment of a laser pattern applied to a target material in accordance with the present inventions.
Figure 10B:
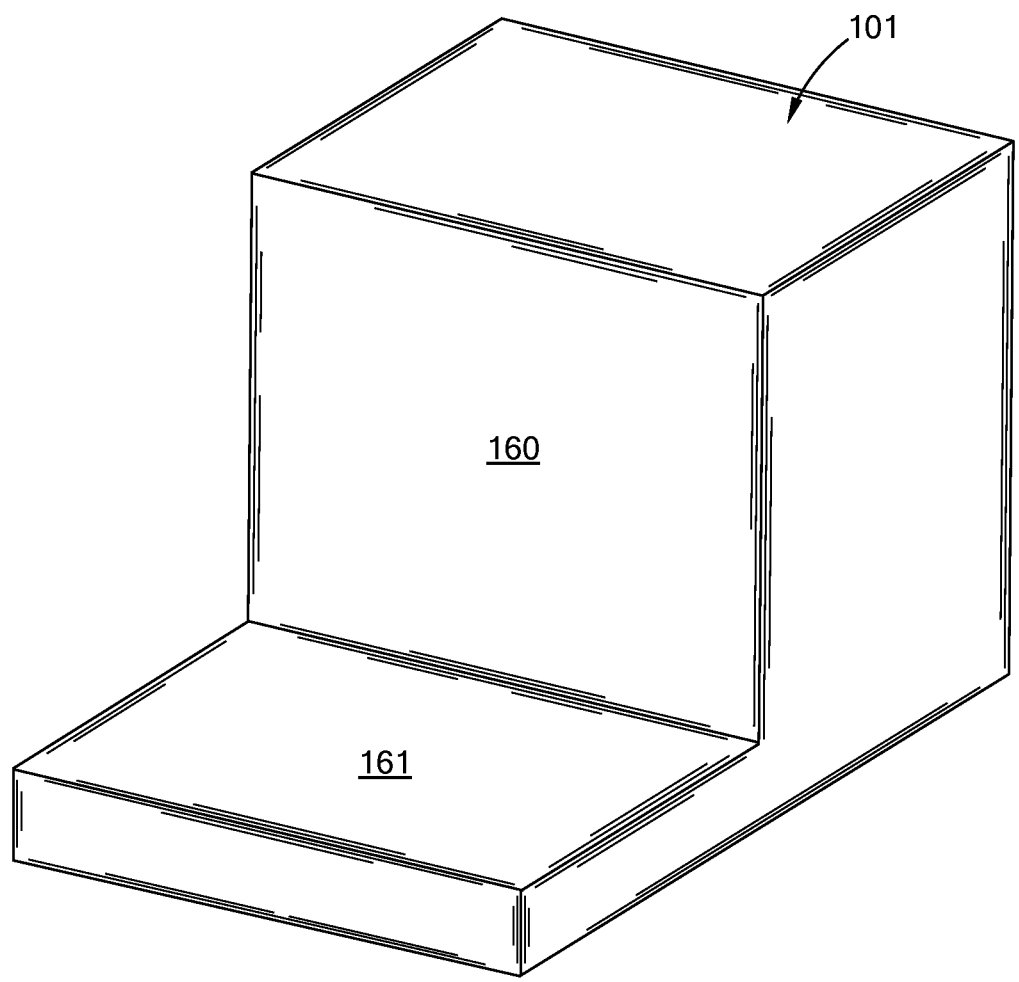
FIG. 10B is a perspective schematic view of the target material after delivery of the laser beam pattern of FIG. 10A in accordance with the present inventions.

Turning to FIG. 10A there is provided an example of a crosshatched laser beam delivery pattern 100 shown with respect to a target material 101. The laser beam delivery pattern has a series of horizontal (as shown in the figure) planer cuts 120, 121, 122, and a series of vertical (as shown in the figure) planer cutting 130, 131, 132. The planar cuts intersect to form a crosshatched pattern. The distance 150 between the vertical cuts, and the distance 151 between the horizontal cuts is selected to provide for the laser-affected zones of each cut to be substantially adjacent, and preferably adjacent, each other. As shown in FIG. 10B, when a high power laser beam is delivered in this pattern to the target 101 material, a portion of the target material is volumetrically removed from the target 101 leaving behind faces 160 and 161.

Example 11

A crosshatch laser beam delivery pattern having 100 essentially vertical planar cuts and 20 essentially horizontal planar cuts is delivered to the rock face of an open face mine. The laser beam has a focal point of 100 feet, a beam waist of about 2 cm and a depth of focus of about 8 feet. The laser beam has a beam angle of 10°. The laser beam has a power of 40 kW. The vertical planes of the pattern are cut first, by firing the laser at the top of the planar cut until the desired depth of the initial hole is achieved and then moving the laser beam down until the length of the cut, to depth has been completed. Once the vertical cuts have been done, the horizontal cuts are made.

Example 12

A crosshatch laser beam delivery pattern having 300 essentially vertical planar cuts and 200 essentially horizontal planar cuts is delivered to the rock face in a subsurface mine. The laser beam has a focal point of 50 feet, a beam waste having a length of 5 feet, and a maximum spot size diameter of about 2 cm. The laser beam has a beam angle of 15°. The laser beam has a power of 50 kW. The vertical planes of the pattern are cut first, by firing the laser at the top of the planar cut until the desired depth of the initial hole is achieved and then moving the laser beam down until the length of the cut, to depth has been completed. Once the vertical cuts have been done, the horizontal cuts are made.

Example 13

A crosshatch laser beam delivery pattern having 100 essentially vertical planar cuts and 20 essentially horizontal planar cuts is delivered to the rock face of an open pit mine. The laser beam has a focal point of 100 feet, a beam waste having a length of 8 feet, and a maximum spot size diameter of about 2 cm. The laser beam has a beam angle of 10°. The laser beam has a power of 40 kW. The horizontal planes of the pattern are cut first, by firing the laser at the top of the planar cut until the desired depth of the initial hole is achieved and then moving the laser beam across until the length of the cut, to depth has been completed. Once the horizontal cuts have been done, the vertical cuts are made.

Example 14

A crosshatch laser beam delivery pattern having 300 essentially vertical planar cuts and 200 essentially horizontal planar cuts is delivered to the rock face in a subsurface mine. The laser beam has a focal point of 50 feet, a beam waste having a length of 5 feet, and a maximum spot size diameter of about 2 cm. The laser beam has a beam angle of 15°. The laser beam has a power of 50 kW. The horizontal planes of the pattern are cut first, by firing the laser at the top of the planar cut until the desired depth of the initial hole is achieved and then moving the laser beam across until the length of the cut, to depth has been completed. Once the horizontal cuts have been done, the vertical cuts are made.

Example 15

A laser tool was used to cut perforations in rock samples. The laser power was 15.3 kW, the beam angle was 15°, the standoff distance was 3 feet, and a laser tool of the general type shown in FIG. 1 was used.

| Run No. | Depth (in) | Time (s) | Rate (ft/hr) |
|---|---|---|---|
| Sandstone | | | |
| 1 | 2 | 210 | 2.86 |
| 2 | 4.5 | 210 | 6.43 |
| 3 | 4.75 | 210 | 6.79 |

-continued

| Run No. | Depth (in) | Time (s) | Rate (ft/hr) |
|---|---|---|---|
| Granite | | | |
| 1 | 9 | 330 | 8.18 |
| 2 | 9 | 230 | 11.74 |
| 3 | 9 | 255 | 10.59 |
| Brohm | | | |
| 1 | 12 | 720 | 5.00 |
| 2 | 12 | 720 | 5.00 |
| 3 | 12.5 | 745 | 5.03 |

Example 16

A laser tool was used to cut perforations in Brohm rock samples. The laser power was 15 kW, the beam angle was 15°, the standoff distances were varied, and a laser tool of the general type shown in FIG. 1 was used.

| Run No. | Depth (in) | Time (s) | Rate (ft/hr) |
|---|---|---|---|
| Standoff distance 3 ft | | | |
| 1 | 9.125 | 180 | 15.21 |
| 2 | 9.25 | 180 | 15.42 |
| Standoff distance 4.5 ft | | | |
| 1 | 8.9375 | 180 | 14.90 |
| 2 | 8.875 | 180 | 14.79 |
| Standoff distance 6 ft | | | |
| 1 | 8 | 180 | 13.33 |
| 2 | 8.25 | 180 | 13.75 |

Example 17

A laser tool was used to cut perforations in Brohm rock samples. The laser power was 15 kW, the beam angle was 15°, the standoff distances were varied, and a laser tool of the general type shown in FIG. 1 was used.

| Run No. | Standoff ft | Depth (in) | Time (s) | Rate (ft/hr) |
|---|---|---|---|---|
| 1 | 3 | 13.25 | 249 | 15.96 |
| 2 | 7.75 | 6.5 | 180 | 10.83 |

Example 18

A laser tool was used to cut perforations in Brohm rock samples. The laser power was 15.3 kW, the beam angle was 30°, the standoff distance was 3 feet, and a laser tool of the general type shown in FIG. 1 was used. In these tests the laser beam penetrated completely through the rock sample.

| Run No. | Depth (in) | Time (s) | Rate (ft/hr) |
|---|---|---|---|
| 1 | 7.875 | 102 | 23.16 |
| 2 | 7.375 | 98 | 22.58 |
| 3 | 7.375 | 95 | 23.29 |
| 4 | 6.625 | 88 | 22.59 |

-continued

| Run No. | Depth (in) | Time (s) | Rate (ft/hr) |
|---|---|---|---|
| 5 | 10.5 | 243 | 12.96 |
| 6 | 10.375 | 220 | 14.15 |
| 7 | 9.75 | 233 | 12.55 |
| 8 | 8.5 | 115 | 22.17 |

Example 19

A laser tool was used to cut perforations in limestone rock samples. The laser power was 15.3 kW, the beam angle was 15°, the standoff distance was 3 feet, and a laser tool of the general type shown in FIG. 1 was used.

| Run No. | Depth (in) | Time (s) | Rate (ft/hr) |
|---|---|---|---|
| 1 | 4.5 | 240 | 5.63 |
| 2 | 2.5 | 60 | 12.50 |
| 3 | 2.5 | 120 | 6.25 |

Example 20

A laser tool was used to cut perforations in limestone rock samples. The laser power was varied, the beam angle was 30°, the standoff distance was 3 feet, and a laser tool of the general type shown in FIG. 1 was used.

| Run No. | LP kW | Depth (in) | Time (s) | Rate (ft/hr) |
|---|---|---|---|---|
| 1 | 15 | 4.375 | 240 | 5.47 |
| 2 | 10 | 6 | 196 | 9.18 |
| 3 | 10 | 4.5 | 240 | 5.63 |

Example 21

A laser tool was used to cut perforations in rock samples. The laser power was 15.3 kW, the beam angle was 15°, the standoff distance was 3 feet, and a laser tool of the general type shown in FIG. 1 was used.

| Run No. | Depth (in) | Time (s) | Rate (ft/hr) |
|---|---|---|---|
| 1 | 13.5 | 410 | 9.88 |
| 2 | 14.5 | 780 | 5.58 |

Example 22

A laser tool was used to cut perforations in rock samples. The laser power was varied, the beam angle was 30°, the standoff distance was 3 feet, and a laser tool of the general type shown in FIG. 1 was used.

| Run No. | LP kW | Depth (in) | Time (s) | Rate (ft/hr) |
|---|---|---|---|---|
| 1 | 15 | 11.5 | 319 | 10.82 |
| 2 | 10 | 10.5 | 227 | 13.88 |
| 3 | 10 | 10.375 | 319 | 9.76 |
| 4 | 5 | 10.25 | 600 | 5.13 |
| 5 | 2.5 | 5.25 | 600 | 2.63 |

In addition to these, examples, the high power laser systems, tools, devices and methods of the present inventions may find other uses and applications in activities such as: off-shore activities; subsea activities; decommissioning structures such as, factories, nuclear facilities, nuclear reactors, pipelines, bridges, ships, hazardous waste locations; contaminated structures, etc.; cutting and removal of structures in refineries; civil engineering projects and construction and demolitions; concrete repair and removal; mining; surface mining; deep mining; rock and earth removal; surface mining; tunneling; making small diameter bores; oil field perforating; oil field fracking; well completion; precise and from a distance, in-place milling and machining; heat treating; and combinations and variations of these and other activities and operations.

In addition to the foregoing Examples, figures and embodiments, other optics assemblies and configurations may be used to focus the laser beam and provide long stand off distance operations. Such optics assemblies would include zoom optics based on a moveable lens, zoom optics based on a movable mirror, zoom optics based on an adaptive optic, and combinations and variations of these.

Figure 11:
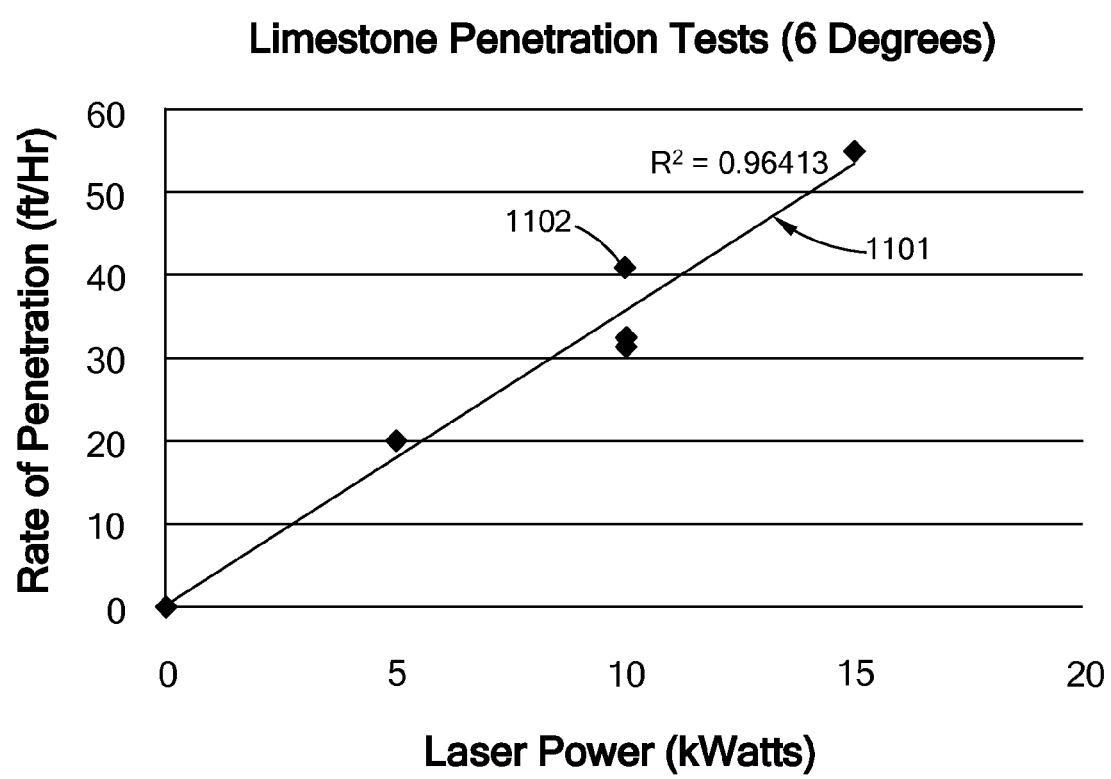
FIG. 11 is a chart showing an embodiment of laser penetration rates in accordance with the present inventions.

For example, and preferably, gravity can be used as the motive force to remove the molten material by drilling the laser at a slight upward angle, this angle can be as small as a few degrees or as much as 90 degrees from horizontal, i.e., a vertical hole. In general, the greater the angle, the faster the flow rate of the molten rock. For example, the temperature for the melting point for quartz is about 2,100° C. This effect is shown in the chart of FIG. 11, where the laser is pointed up 6° from horizontal, making a natural incline for the molten rock, e.g., lava, to flow from the hole that is being drilled. The penetration rate of the laser beam into the hard limestone formation at an inclination angle of 6 degrees is essentially linear with increasing laser power, e.g., line 1101. Thus, the diamonds, e.g., 1102 show penetration rate in ft/hr at a particular laser power in kW. Thus, for example, diamond 1102 shows that a rate of 41 ft/hr is obtained at about 10 kW of laser power. The penetration rates vs power form a linear relationship as shown by line 1101. It being noted that at 0° the laser beam may not be able to penetrate the rock formation unassisted, in some situations, because of the lava puddling at the entrance to the hole. Further, the hole shape and size, beam size and power distribution may also have an effect on the flow rate of the molten rock. The laser can penetrate deep into the rock by using either a collimated laser beam or a long focal length laser beam. In the gravity cleared embodiment, the laser beam processing head can be essentially against the rock (a drain for the molten material to flow from the hole can be provided) or several feet from the rock since gravity does the clearing of the rock debris and there is no need for fluid to be used to clear the hole.

However, for example, downward laser perforations have been made in rocks when the focus is before (or above) the rock face and the downward angel of the beam is about 4 degrees, without the need for assistance to clear the hole.

A single high power laser may be utilized in the system, tools and operations, or there may be two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 10 kW, 20 kW, 50 kW or more power and, which emit laser beams with wavelengths in the range from about 455 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers).

An example of this general type of fiber laser is the IPG YLS-20000. The detailed properties of which are disclosed in US patent application Publication Number 2010/0044106.

Examples of lasers, conveyance structures, high power laser fibers, high power laser systems, optics, optics housings to isolate optics from vibration and environment conditions, break detection and safety monitoring, control systems, connectors, cutters, and other laser related devices, systems and methods that may be used with, in, or in conjunction with, the various embodiments of devices systems, tools, activities and operations set forth in this specification are disclosed and taught in the following US patent application publications and US patent applications: Publication Number 2010/0044106; Publication Number 2010/0044105; Publication Number 2010/0044103; Publication Number 2010/0215326; Publication Number 2012/0020631; Publication Number 2012/0074110; Publication No. 2012/0068086; Publication No. 2012/0248078; Ser. No. 13/403,723; Ser. No. 13/403,509; Ser. No. 13/486,795; Ser. No. 13/565,345; Ser. No. 13/782,869; Ser. No. 61/605,429; Ser. No. 13/768,149; and Ser. No. 61/605,434, the entire disclosures of each of which are incorporated herein by reference.

In addition to the use of high power electromagnetic energy, such as high power laser beams, other forms of directed energy or means to provide the same, may be utilized in, in addition to, or in conjunction with the devices systems, tools, activities and operations set forth in this specification. Such directed energy could include, for example, non-optical stimulated emission electromagnetic energy, non-optical coherent electromagnetic energy, microwaves, sound waves, millimeter waves, plasma, electric arcs, flame, flame jets, steam and combinations of the foregoing, as well as, water jets and particle jets. It is noted, however, that each of these other such directed energies, has significant disadvantages when compared to high power laser energy. Nevertheless, the use of these other less desirable directed energy means is contemplated by the present inventions as directed energy means.

These tools, systems and operations provide a unique laser drilling and cutting methods for performing many activities such as prepping blast holes or cutting out the slope of a rock face, they also provide the ability to reduce the need for, if not to eliminate the need for the use of explosives in construction, demolition, decommissioning, mining, drilling and other types of activities where explosives and large equipment are utilized. It being understood, that precision activities of a very fine nature may also be performed, such as precision cutting of a part or component in a high hazardous environment, such as within a nuclear reactor containment structure. Additionally, a high power laser, of 1 kW or greater, can be used to drill a hole directly in a rock face. A laser, when drilling into a vertical wall or ceiling can penetrate to the maximum limit of the laser beam's intensity, as long as, fresh material is being exposed to the laser beams energy. Thus, by way of example, it is preferable that there is room for the melted rock to flow from the laser drilled hole, and if necessary and preferably that some means be employed to force or assist in the melted rock being removed from the laser drilled hole, or from the laser beam path as it progress into and advances the hole.

Depending upon the target material being cut, the location of the cutting, e.g., in a confined area or in the open, it may be advisable or preferable to have a system for handling, managing, processing and combinations and variation of these, the gases, fumes, and other air born or gaseous materials that are created during or by the laser operation. Thus, for example and preferably, a high volume vacuum system can be located near the exit of the drilling or cutting region to be able to remove any toxic fumes from the molten region.

The shape of the laser beam, the laser beam spot on the surface of the target material, and the resultant hole that is created by the laser beam in the target material may be circular, square, v-shaped, circular with a flat bottom, square with a rounded bottom, and other shapes and configurations that may be utilized and can be based upon the flow characteristics of the molten target material, and selected to maximize the removal of that material.

The various embodiments of devices systems, tools, activities and operations set forth in this specification may be used with various high power laser systems and conveyance structures and systems, in addition to those embodiments of the Figures and Examples in this specification. The various embodiments of devices systems, tools, activities and operations set forth in this specification may be used with: other high power laser systems that may be developed in the future: with existing non-high power laser systems, which may be modified, in-part, based on the teachings of this specification, to create a high power laser system; and with high power directed energy systems. Further, the various embodiments of devices systems, tools, activities and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A method of removing material using high power laser energy, the method comprising:
   a. directing a high power laser beam having a power of at least 1 kW and a beam angle of greater than 2° toward a surface of a material in a predetermined three-dimensional pattern, corresponding to a predetermined volumetric shape;
   b. the laser beam creating a hole in the material having a bottom comprising molten material, wherein the laser affected areas substantially filling the predetermined volumetric shape; and, c. advancing the hole by flowing the molten material back towards the laser beam, thereby exposing solid material for the laser beam to melt; and, d. wherein the high power laser beam is operable to have a stand off distance of at least 3 feet.

2. The method of claim 1, wherein the laser beam is directed at a beam angle of at least 10%.

3. The method of claim 2, wherein the laser beam is directed at a beam angle of at least 30°.

4. The method of claim 2, wherein the laser beam is directed at a beam angle of at least 80°.

5. A method of removing material using high power laser energy, the method comprising:

a. directing a high power laser beam having a power of at least 1 kW toward a surface of a material in a predetermined three-dimensional pattern, corresponding to a predetermined volumetric shape;

b. the laser beam creating a hole in the material having a bottom comprising molten material, wherein the laser affected areas substantially filling the predetermined volumetric shape; and, c. advancing the hole by flowing the molten material back towards the laser beam, thereby exposing solid material for the laser beam to melt; and d. wherein the high power laser beam is operable to have a stand off distance of at least 3 feet.

6. A method of removing material using high power laser energy, the method comprising:

a. applying laser beam having a power of at least 1 KW and sufficient to penetrate the material in a predetermined three-dimensional pattern, corresponding to a predetermined volumetric shape;

b. the laser beam creating a hole in the material having, a bottom comprising molten material; and, c. advancing the hole by flowing the molten material back towards the laser beam, thereby exposing solid material for the laser beam to melt and d. wherein the high power laser beam is operable to have a stand off distance of at least 3 feet.

7. The method of claim 6, wherein the laser beam has a power of at least 5 kW.

8. The method of claim 6, wherein the laser beam has a power of at least 10 kW.

9. The method of claim 6, wherein the laser bean has a power of at least 40 kW.

10. The method of claim 6, wherein the laser beam has a power of at least 60 kW.

11. The method of claim 6, wherein the laser beam has a power of at least 100 kW.

12. A method of removing material using high power laser energy, the method comprising:

a. applying high power directed energy having a power of at least 1 kW and sufficient to penetrate the material in a predetermined three-dimensional pattern, corresponding to a predetermined volumetric shape;

b. the laser affected areas substantially filling the predetermined volumetric shape;

c. the laser beam creating a hole in the material having a bottom comprising molten material; and, d. advancing the hole by flowing the molten material back towards the laser beam, thereby exposing solid material for the laser beam to melt;

e. wherein the high power laser beam is operable to have a stand off distance of at least 3 feet.

13. The method of claim 12, wherein the three dimensional pattern comprises a line.

14. The method of claim 13, wherein the line forms a spiral.

15. The method of claim 12, wherein the three dimensional pattern has a length, a width and a depth, and the depth is at least 10 feet.

16. The method of claim 12, wherein the three dimensional pattern comprises a plurality of lines.

17. The method of claim 16, wherein at least two of the plurality of lines is interconnected.

18. The method of claim 12, wherein the volumetric shape corresponds to a mineral deposit.

19. The method of claim 12, wherein the depth of penetration is self-limiting.

20. The method of claim 12, wherein the volumetric shape is a cube.

21. The method of claim 12, wherein the volumetric shape is a cylinder.

22. The method of claim 12, wherein the spot size of the beam waist is less than about 2.5 cm.

23. The method of claim 12, wherein the spot size of the beam waist is less than about 2.5 cm$^2$, and the waist length is at least 2 ft.

24. The method of claim 12, wherein the spot size of the beam waist is less than about 2.5 cm$^2$, the waist length is at least 2 ft.

25. The method of claim 12, wherein the beam shape is circular.

26. The method of claim 12, wherein the beam shape is rectangular.

* * * * *